(12) United States Patent
Klecker et al.

(10) Patent No.: US 7,607,231 B2
(45) Date of Patent: Oct. 27, 2009

(54) FOLDING MULTIPURPOSE TOOL WITH SHEARS AND COMFORTABLE HANDLES

(75) Inventors: Glenn A. Klecker, Silverton, OR (US); John P. Nenadic, Camas, WA (US)

(73) Assignee: Leatherman Tool Group, Inc., Portland, OR (US)

( * ) Notice: Subject to any disclaimer, the term of this patent is extended or adjusted under 35 U.S.C. 154(b) by 447 days.

(21) Appl. No.: 11/199,924

(22) Filed: Aug. 8, 2005

(65) Prior Publication Data

US 2005/0268468 A1    Dec. 8, 2005

Related U.S. Application Data

(63) Continuation-in-part of application No. 10/791,589, filed on Mar. 2, 2004.

(51) Int. Cl.
*B26B 13/04* (2006.01)
*B26B 13/16* (2006.01)

(52) U.S. Cl. .............................. 30/236; 30/255; 30/262; 7/118; 7/129; 7/158

(58) Field of Classification Search .................. 30/123, 30/131, 134, 135, 146, 236, 255, 261, 262; 7/113, 118, 125–131, 158; D8/55, 107; 81/9.4

See application file for complete search history.

(56) References Cited

U.S. PATENT DOCUMENTS

| 148,488 | A | 3/1874 | Mosher |
|---|---|---|---|
| 205,108 | A | 6/1878 | Locke |
| 310,439 | A | 1/1885 | Kamak |
| 403,500 | A | 5/1889 | Wingenroth |
| 405,642 | A | 6/1889 | Woodle |
| 406,524 | A | 7/1889 | Jennings |
| 459,409 | A | 9/1891 | Maltby |
| 486,560 | A | 11/1892 | Dinkel |
| 516,389 | A | 3/1894 | Crutsinger |
| 569,284 | A | 10/1896 | Jacks |
| 614,167 | A | 11/1898 | Gardella |
| 660,288 | A | 10/1900 | Broadbooks |
| 799,617 | A | 9/1905 | Steffa |

(Continued)

FOREIGN PATENT DOCUMENTS

DE    30788    3/1885

(Continued)

OTHER PUBLICATIONS

A.G. Russell™ Knives, Summer 2008, p. 29 (Letherman® Vista Hunting Pruner).*

(Continued)

*Primary Examiner*—Jason Daniel Prone
(74) *Attorney, Agent, or Firm*—Chernoff, Vilhauer, McClung & Stenzel, LLP

(57) ABSTRACT

A multipurpose tool includes bypass shears with handles that fold around the shears into a compact configuration in which the blades of the shears are hidden. A sharp-edged cutter is removable from the shears for resharpening or replacement, in one version of the tool. A blade safety lock holds the blades closed and is automatically engaged as the handles are folded. The handles are comfortably shaped and may include overmolded elastomeric cushioning portions.

15 Claims, 21 Drawing Sheets

U.S. PATENT DOCUMENTS

| | | | |
|---|---|---|---|
| 835,791 A | 11/1906 | Kelly | |
| 858,003 A * | 6/1907 | Klever | 30/146 |
| 867,514 A | 10/1907 | King | |
| 887,494 A | 5/1908 | Mulertz | |
| 1,196,278 A | 8/1916 | Poole | |
| 1,242,645 A | 10/1917 | Bockstahler | |
| 1,287,637 A | 12/1918 | Cobb | |
| 1,426,214 A | 8/1922 | Rausse | |
| 1,634,848 A | 7/1927 | Perrakis | |
| 1,666,253 A | 4/1928 | Blincoe | |
| 1,944,116 A | 1/1934 | Stratman | |
| 2,295,385 A | 9/1942 | Connors | |
| 2,310,959 A | 2/1943 | James | |
| 2,407,237 A | 9/1946 | Keiser, Jr. | |
| 2,439,071 A | 4/1948 | Basham | |
| 2,504,447 A | 4/1950 | Polincovsky | |
| 2,574,354 A | 11/1951 | Smith | |
| 2,650,423 A | 9/1953 | Phillips | |
| 2,662,286 A | 12/1953 | Yeomans | |
| 2,674,796 A | 4/1954 | Herold | |
| 2,721,386 A | 10/1955 | Habart | |
| 2,741,841 A * | 4/1956 | Egeth | 30/135 |
| 2,821,018 A | 1/1958 | Schwieso | |
| 2,938,266 A | 5/1960 | Klein, Jr. | |
| 3,100,343 A | 8/1963 | Wessel | |
| 3,357,287 A | 12/1967 | Wertepny, Sr. | |
| 3,572,192 A | 3/1971 | Juras | |
| 3,775,846 A | 12/1973 | Johnson | |
| 3,834,022 A | 9/1974 | Students | |
| 3,851,389 A | 12/1974 | Swanson | |
| 3,869,793 A | 3/1975 | Ferguson | |
| 4,079,513 A | 3/1978 | Harrison | |
| 4,094,064 A | 6/1978 | Nishikawa et al. | |
| 4,099,326 A | 7/1978 | Mori et al. | |
| 4,114,268 A | 9/1978 | Hildebrandt et al. | |
| 4,117,592 A | 10/1978 | Mori et al. | |
| 4,169,312 A | 10/1979 | Mar | |
| 4,203,208 A | 5/1980 | Tausendfreundt et al. | |
| 4,233,737 A | 11/1980 | Poehlmann | |
| 4,238,862 A | 12/1980 | Leatherman | |
| 4,283,854 A | 8/1981 | Austin | |
| 4,391,043 A | 7/1983 | Sizemore et al. | |
| 4,439,923 A * | 4/1984 | Scranton | 30/252 |
| 4,888,869 A | 12/1989 | Leatherman | |
| 4,891,882 A | 1/1990 | Bloom et al. | |
| 4,947,553 A | 8/1990 | Bendickson et al. | |
| 4,995,128 A | 2/1991 | Montgomery et al. | |
| 5,014,379 A | 5/1991 | Hull et al. | |
| 5,033,140 A | 7/1991 | Chen et al. | |
| 5,095,624 A | 3/1992 | Ennis | |
| 5,159,757 A | 11/1992 | Weid et al. | |
| 5,168,629 A | 12/1992 | Willard | |
| 5,189,794 A | 3/1993 | Kuo | |
| 5,203,084 A | 4/1993 | Kuo | |
| 5,243,762 A | 9/1993 | Orthey | |
| 5,245,721 A | 9/1993 | Lowe et al. | |
| 5,263,254 A | 11/1993 | Orthey | |
| 5,272,810 A | 12/1993 | Orthey | |
| 5,280,659 A | 1/1994 | Park | |
| 5,303,475 A | 4/1994 | Baker | |
| 5,359,778 A | 11/1994 | Seber et al. | |
| 5,426,857 A | 6/1995 | Linden | |
| 5,461,784 A | 10/1995 | Baron | |
| 5,483,747 A | 1/1996 | Thompson et al. | |
| 5,485,677 A | 1/1996 | Seber | |
| 5,511,310 A | 4/1996 | Sessions et al. | |
| 5,581,895 A | 12/1996 | Jeffcoat | |
| 5,621,974 A | 4/1997 | Rose et al. | |
| 5,628,115 A | 5/1997 | Hebert | |
| 5,653,525 A | 8/1997 | Park | |
| 5,692,304 A | 12/1997 | Campbell | |
| 5,697,114 A | 12/1997 | McIntosh et al. | |
| 5,697,159 A | 12/1997 | Linden | |
| 5,711,194 A | 1/1998 | Anderson et al. | |
| 5,745,997 A | 5/1998 | Berg et al. | |
| 5,761,815 A | 6/1998 | Lin | |
| 5,765,247 A | 6/1998 | Seber et al. | |
| 5,781,950 A | 7/1998 | Swinden et al. | |
| 5,799,400 A | 9/1998 | Glesser | |
| 5,809,600 A | 9/1998 | Cachot | |
| 5,822,867 A | 10/1998 | Sakai | |
| 5,857,268 A | 1/1999 | Park | |
| D407,286 S | 3/1999 | Seber et al. | |
| 5,904,078 A | 5/1999 | Gustafson et al. | |
| 5,930,900 A | 8/1999 | Chang | |
| 5,933,893 A | 8/1999 | Padden | |
| 5,946,752 A | 9/1999 | Parrish | |
| 5,950,314 A | 9/1999 | Chang | |
| 5,960,498 A | 10/1999 | Nabors et al. | |
| 5,978,993 A | 11/1999 | Rivera | |
| 5,979,059 A | 11/1999 | Leatherman et al. | |
| 5,979,959 A * | 11/1999 | Rivera | 7/128 |
| 6,009,582 A | 1/2000 | Harrison et al. | |
| 6,014,787 A | 1/2000 | Rivera | |
| 6,023,805 A * | 2/2000 | Lin | 7/128 |
| 6,038,723 A | 3/2000 | Nabors et al. | |
| 6,065,213 A | 5/2000 | Rivera | |
| 6,088,861 A | 7/2000 | Sessions et al. | |
| 6,098,225 A | 8/2000 | McIntosh et al. | |
| 6,108,845 A | 8/2000 | Hung et al. | |
| 6,128,805 A | 10/2000 | Rivera | |
| 6,233,769 B1 | 5/2001 | Seber et al. | |
| 6,243,901 B1 | 6/2001 | Elsener et al. | |
| 6,249,977 B1 | 6/2001 | Knoop | |
| 6,282,996 B1 | 9/2001 | Berg et al. | |
| 6,286,397 B1 | 9/2001 | Taggart et al. | |
| 6,289,768 B1 | 9/2001 | Anderson et al. | |
| 6,301,787 B2 | 10/2001 | Mock | |
| 6,305,041 B1 | 10/2001 | Montague et al. | |
| 6,336,272 B1 | 1/2002 | Lee | |
| 6,357,068 B1 | 3/2002 | Seber et al. | |
| 6,389,625 B1 | 5/2002 | Rivera | |
| 6,397,709 B1 | 6/2002 | Wall | |
| 6,418,626 B1 | 7/2002 | Jang | |
| 6,430,768 B2 | 8/2002 | McIntosh et al. | |
| 6,438,848 B1 | 8/2002 | McHenry et al. | |
| 6,446,344 B1 | 9/2002 | Gontar | |
| 6,481,034 B2 | 11/2002 | Elsener et al. | |
| 6,487,740 B2 | 12/2002 | Seber et al. | |
| 6,510,767 B1 | 1/2003 | Rivera | |
| 6,574,868 B1 | 6/2003 | Overholt | |
| 6,622,327 B1 | 9/2003 | Rivera | |
| 6,622,328 B2 | 9/2003 | Rivera | |
| 6,625,832 B2 | 9/2003 | Montague et al. | |
| 6,625,888 B2 | 9/2003 | Heck et al. | |
| 6,634,105 B2 | 10/2003 | Lindermeir | |
| 6,691,357 B2 | 2/2004 | Rivera | |
| 6,694,558 B2 * | 2/2004 | Ping | 7/128 |
| 6,718,585 B2 | 4/2004 | McIntosh et al. | |
| 6,763,543 B2 | 7/2004 | Rivera | |
| 6,990,702 B2 | 1/2006 | Rivera | |
| 7,051,627 B2 | 5/2006 | Rivera | |
| D541,618 S * | 5/2007 | Klecker | D8/107 |
| 7,497,016 B1 * | 3/2009 | Wu | 30/261 |
| 2001/0018778 A1 | 9/2001 | Montague et al. | |
| 2002/0023524 A1 | 2/2002 | Lowe et al. | |
| 2002/0124415 A1 | 9/2002 | Mizutani et al. | |
| 2003/0014868 A1 | 1/2003 | Cech et al. | |
| 2003/0037644 A1 | 2/2003 | Rivera | |
| 2003/0062055 A1 | 4/2003 | Park | |
| 2004/0010924 A1 * | 1/2004 | Hung et al. | 30/255 |
| 2004/0019974 A1 | 2/2004 | Montague et al. | |
| 2004/0045167 A1 * | 3/2004 | Gringer et al. | 30/125 |
| 2004/0237207 A1 | 12/2004 | Rivera | |

| | | | |
|---|---|---|---|
| 2005/0150333 | A1 | 7/2005 | Rivera et al. |
| 2005/0193498 | A1* | 9/2005 | Klecker et al. ............... 7/158 |
| 2005/0198833 | A1* | 9/2005 | Lin ............................ 30/131 |
| 2005/0268468 | A1 | 12/2005 | Klecker et al. |
| 2007/0157771 | A1* | 7/2007 | Rivera ..................... 81/177.4 |
| 2007/0204409 | A1* | 9/2007 | Yale et al. ................... 7/128 |
| 2007/0209121 | A1* | 9/2007 | Rivera ......................... 7/128 |
| 2007/0294833 | A1* | 12/2007 | Rivera et al. ................ 7/128 |
| 2008/0236210 | A1* | 10/2008 | Frazer ......................... 7/128 |
| 2008/0271256 | A1* | 11/2008 | Frazer ......................... 7/128 |

FOREIGN PATENT DOCUMENTS

| | | |
|---|---|---|
| DE | 145784 | 11/1903 |
| DE | 179077 | 11/1906 |
| DE | 2322229 | 5/1974 |
| EP | 0676261 A1 | 10/1995 |
| EP | 0714736 | 6/1996 |
| EP | 0854014 | 7/1998 |
| EP | 0980742 | 2/2000 |
| FR | 2306050 | 10/1976 |
| GB | 5375 | 0/1882 |
| GB | 15859 | 0/1904 |
| GB | 21369 | 0/1895 |
| JP | 3041991 | 2/1991 |
| WO | WO-98/18599 | 5/1998 |

OTHER PUBLICATIONS

"Fox Special" Folding Pliers, Photocopies of product, at least as early as 1990, 4 pages.

Bear MCG, MGC Cutlery Product Catalog, Item No. 444SR depicting a fixed blade knife combined with serrated edge and gut hook, at least as early as 1996, 20 pages.

The Surecut Clipper Co., A Division of Mcguire Industries, The Pocket Gardener, at least as early as Jan. 2003, photocopies of digital photographs taken of product and packaging, 13 pages.

Remington Arms, Co., Bird Hunters Tool, at least as early as Jan. 2003, photocopies of digital photos taken of product and packaging, 6 pages.

The Rumford Gardener, 8 in 1 Gardener Tool, at least as early as Aug. 2003, photocopies of digital photos taken of product and packaging, 8 pages.

R.C.E., Magnum Fish Tail Holder, Photocopy of packaging and digital photographs of product, at least as early as 1990, 9 pages.

File History for U.S. Appl. No. 10/791,589, filed Mar. 2, 2004, downloaded from the U.S. Patent and Trademark Office.

PCT/US2005/006812 Int'l Preliminary Report on Patentability issued May 9, 2006, including Written Opinion of Int'l Searching Authority of Jul. 22, 2005 (6 pgs).

PCT/US2005/006812, one pg International Search Report dated Oct. 7, 2005.

EP 05 72 4371, one page Suppl. European Search Report dated Jul. 3, 2008.

Fiskars 6 page Multi-Snip Tool Kit brochure published on or about Aug. 16, 2006, with color photos of the tool attached.

* cited by examiner

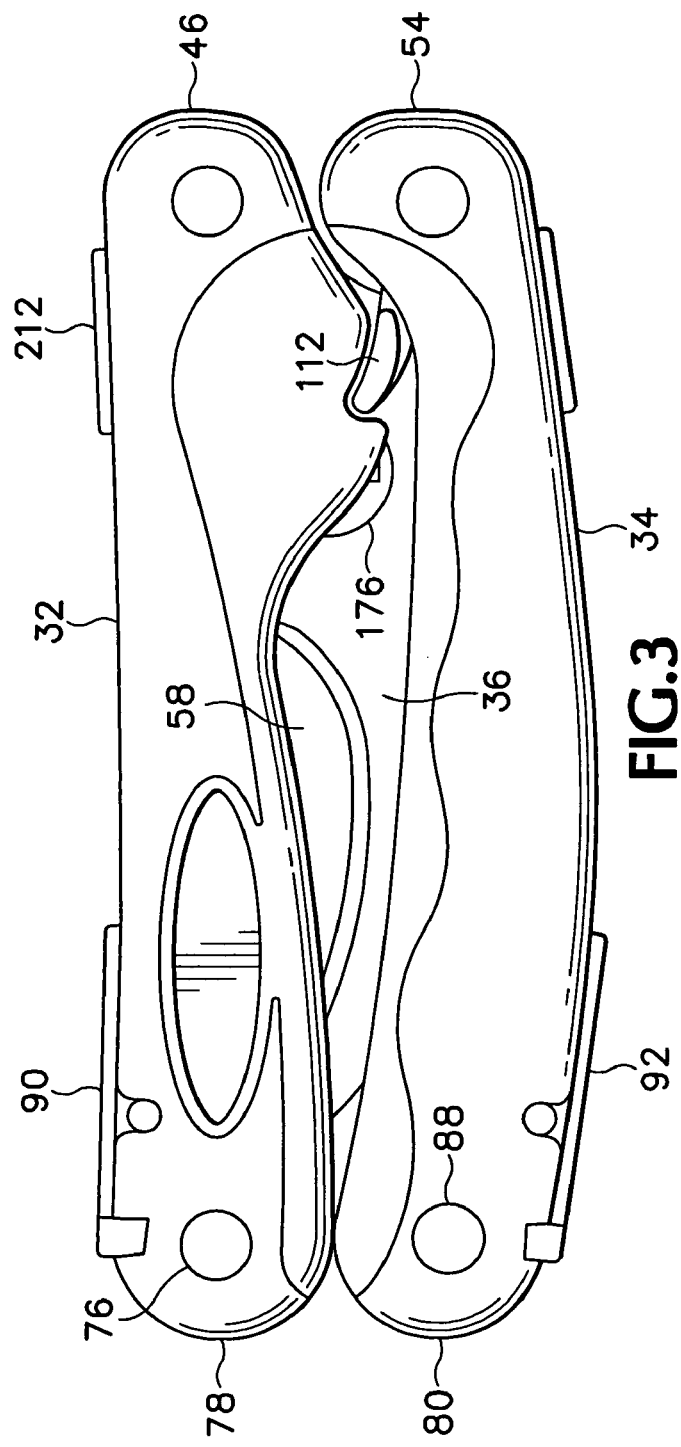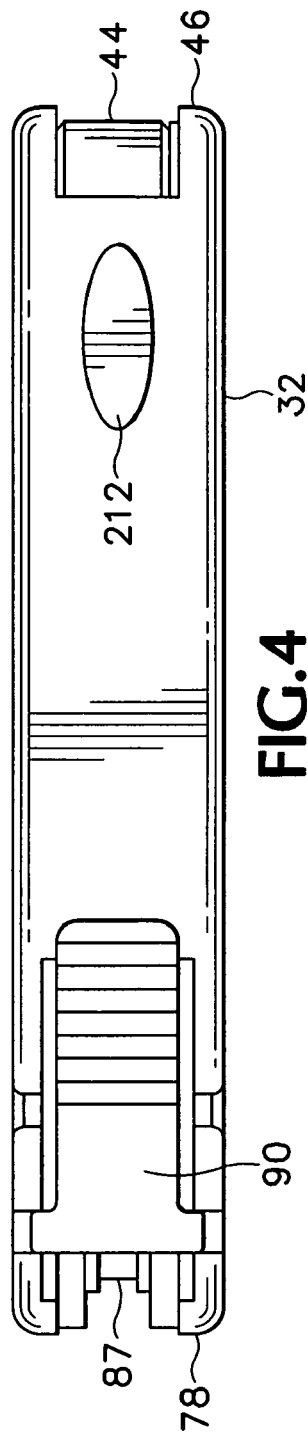

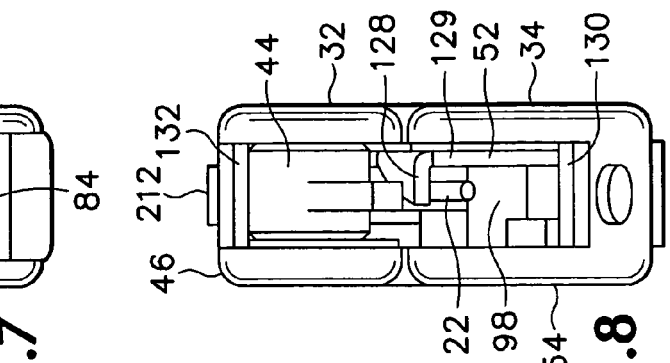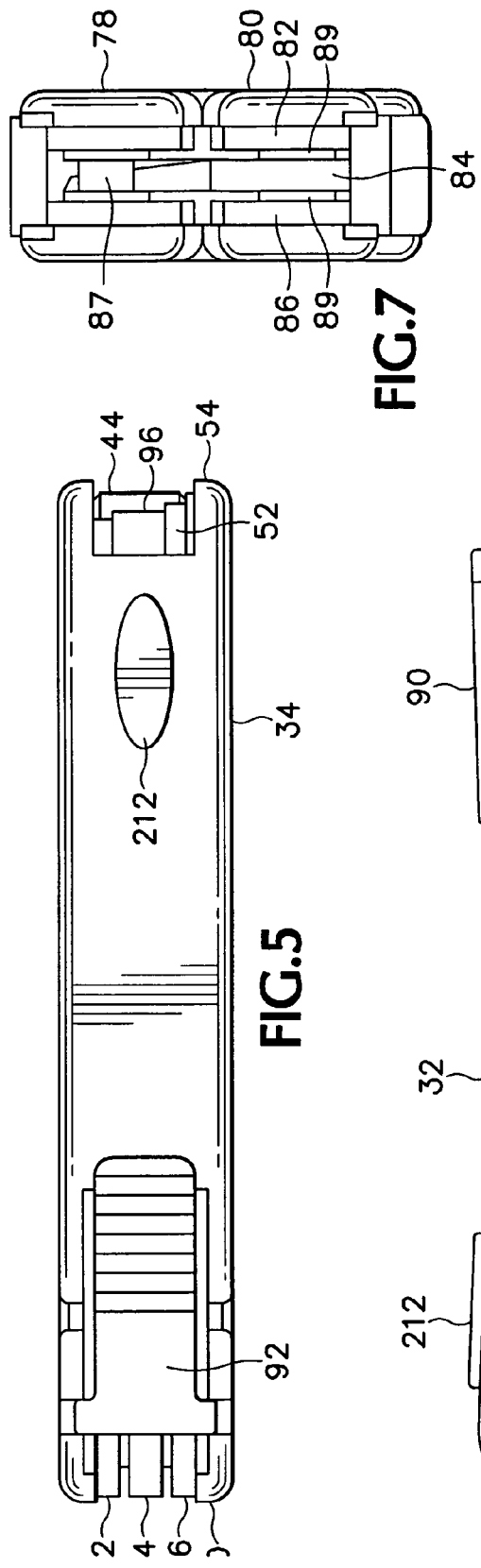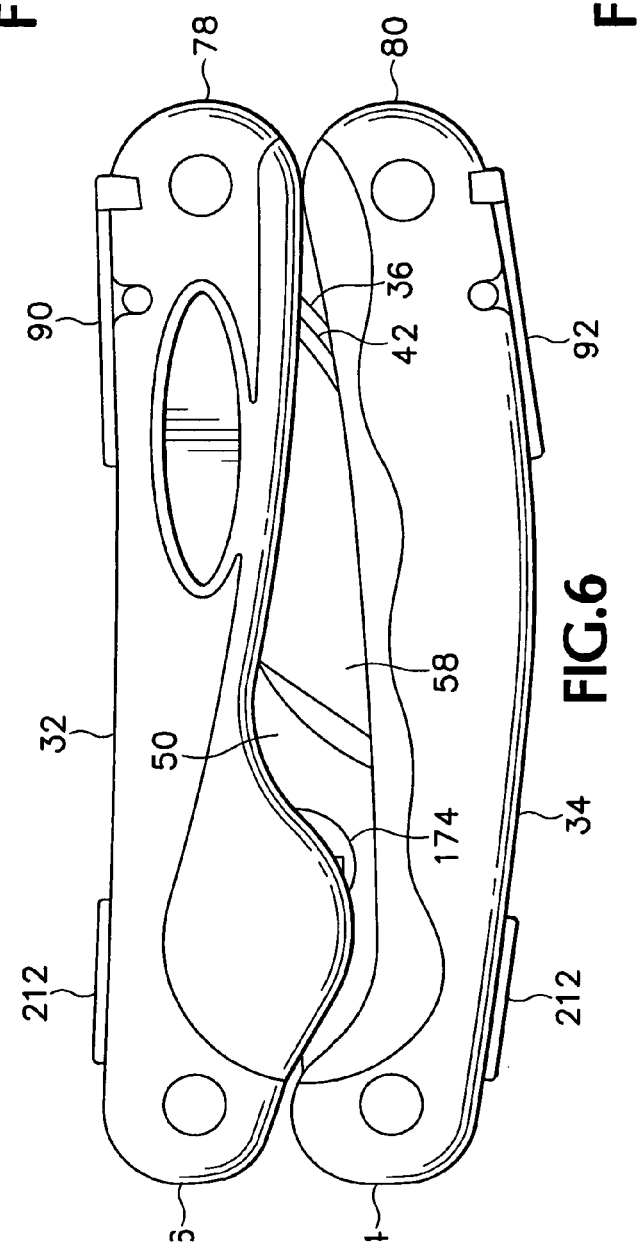

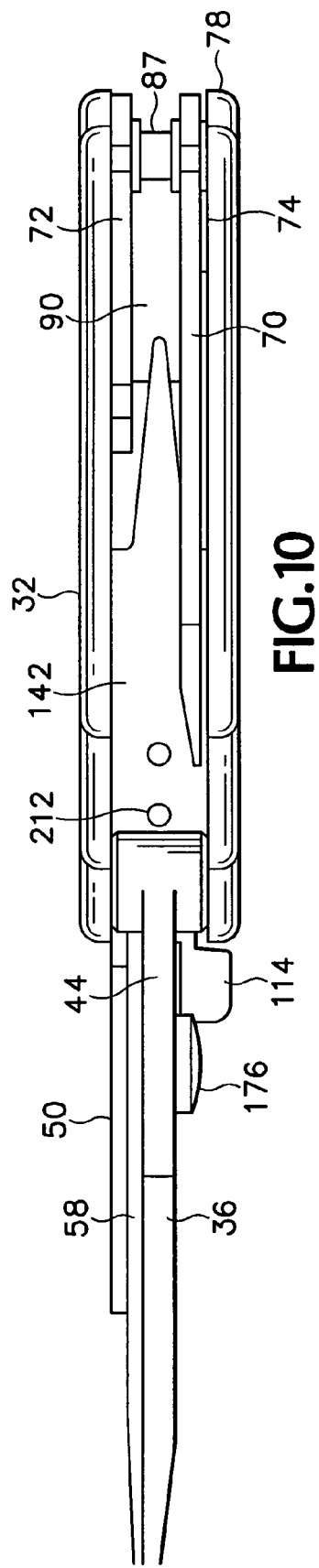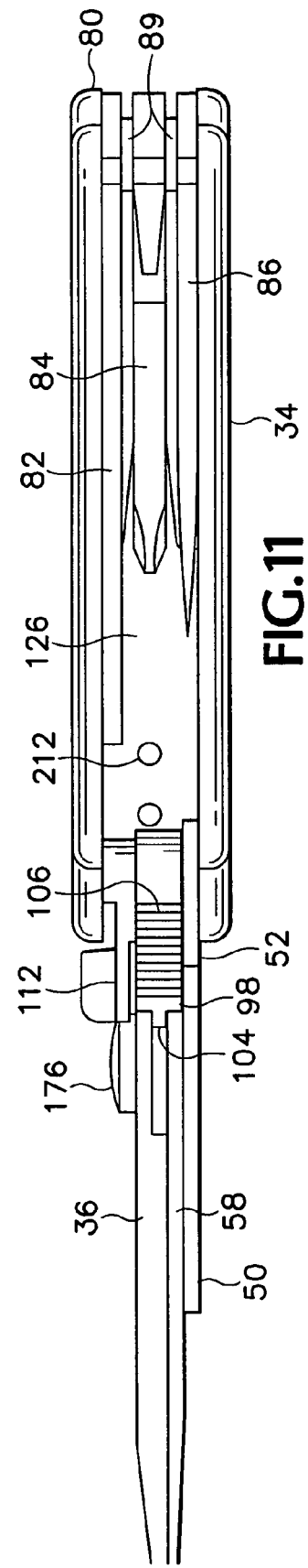

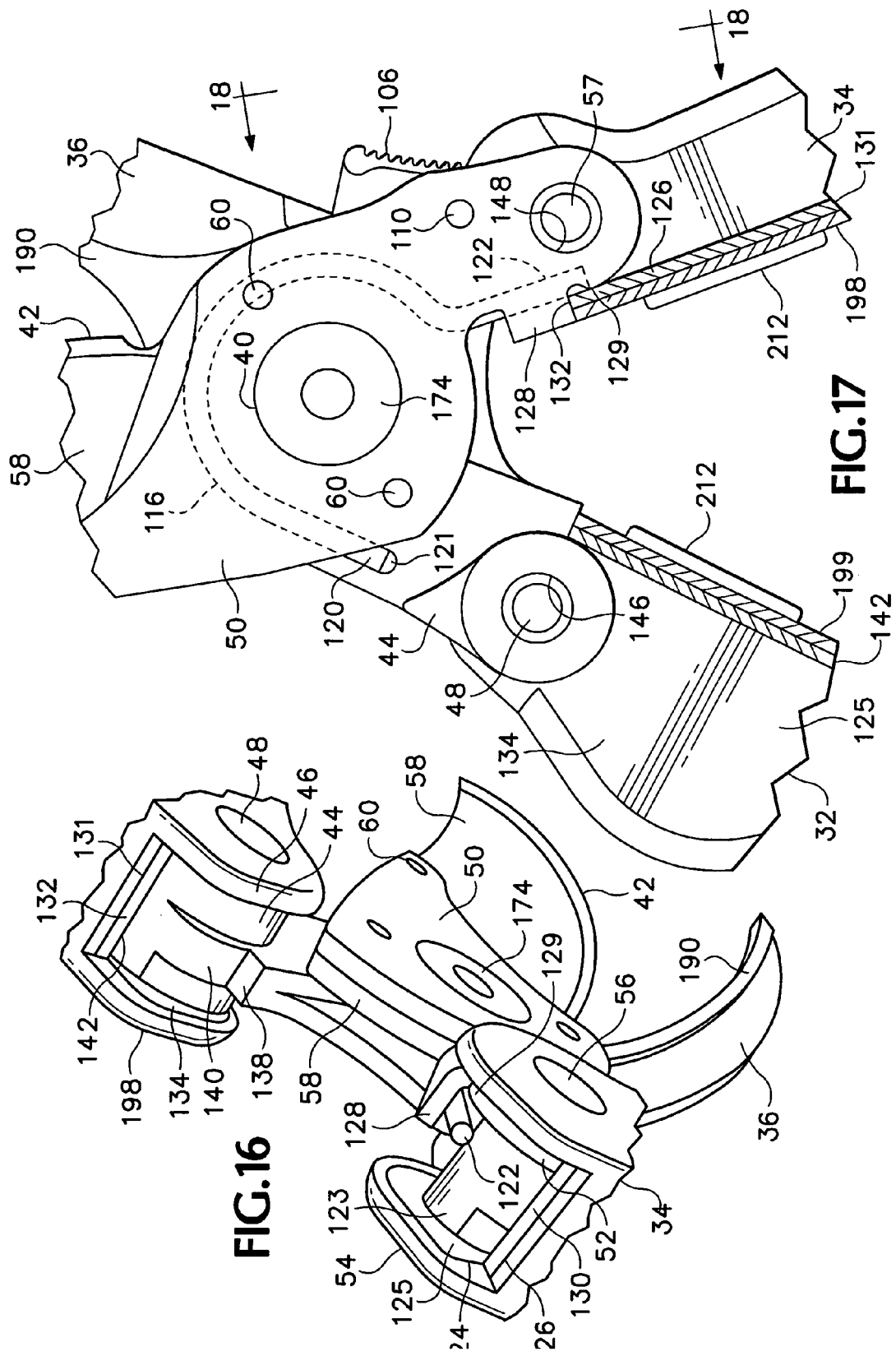

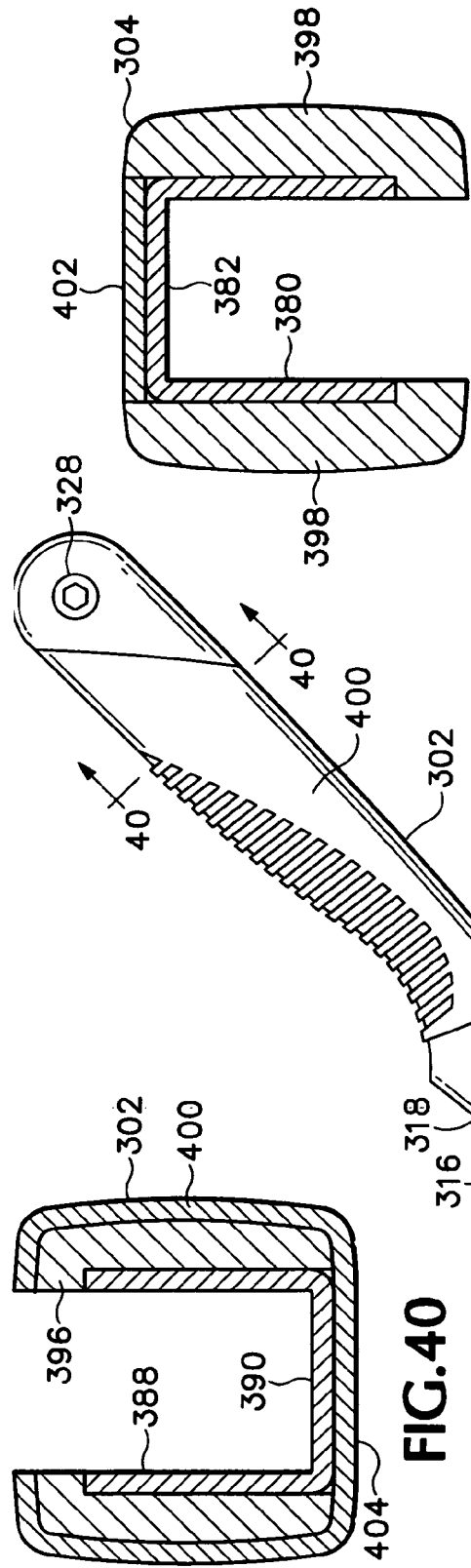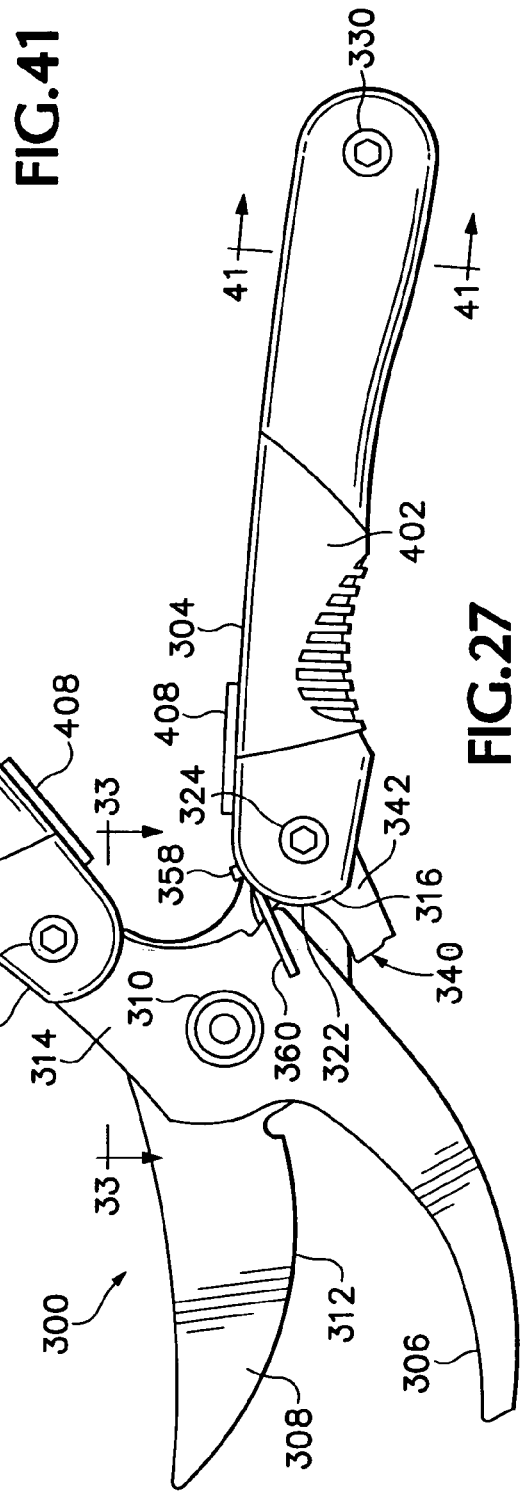

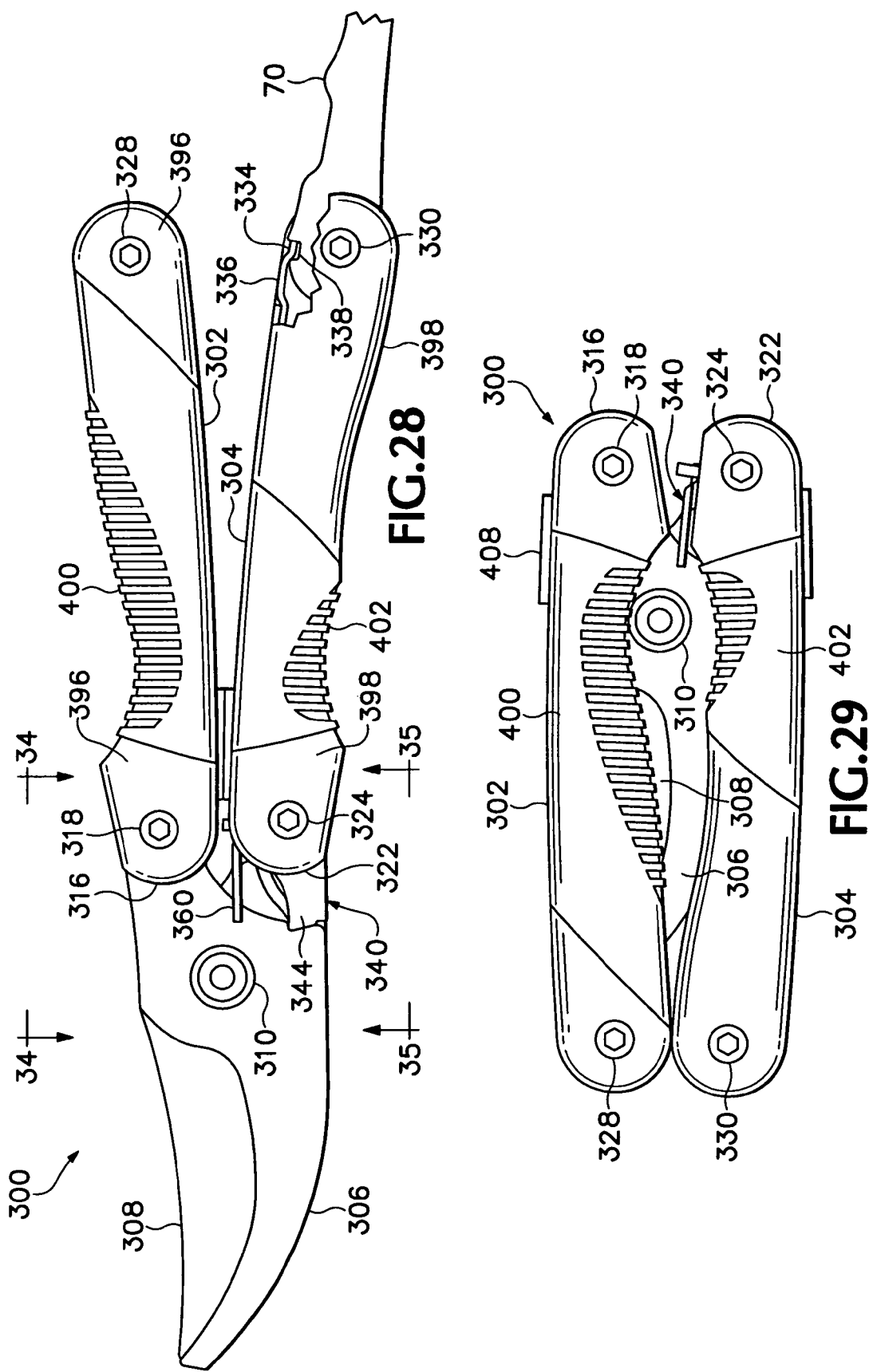

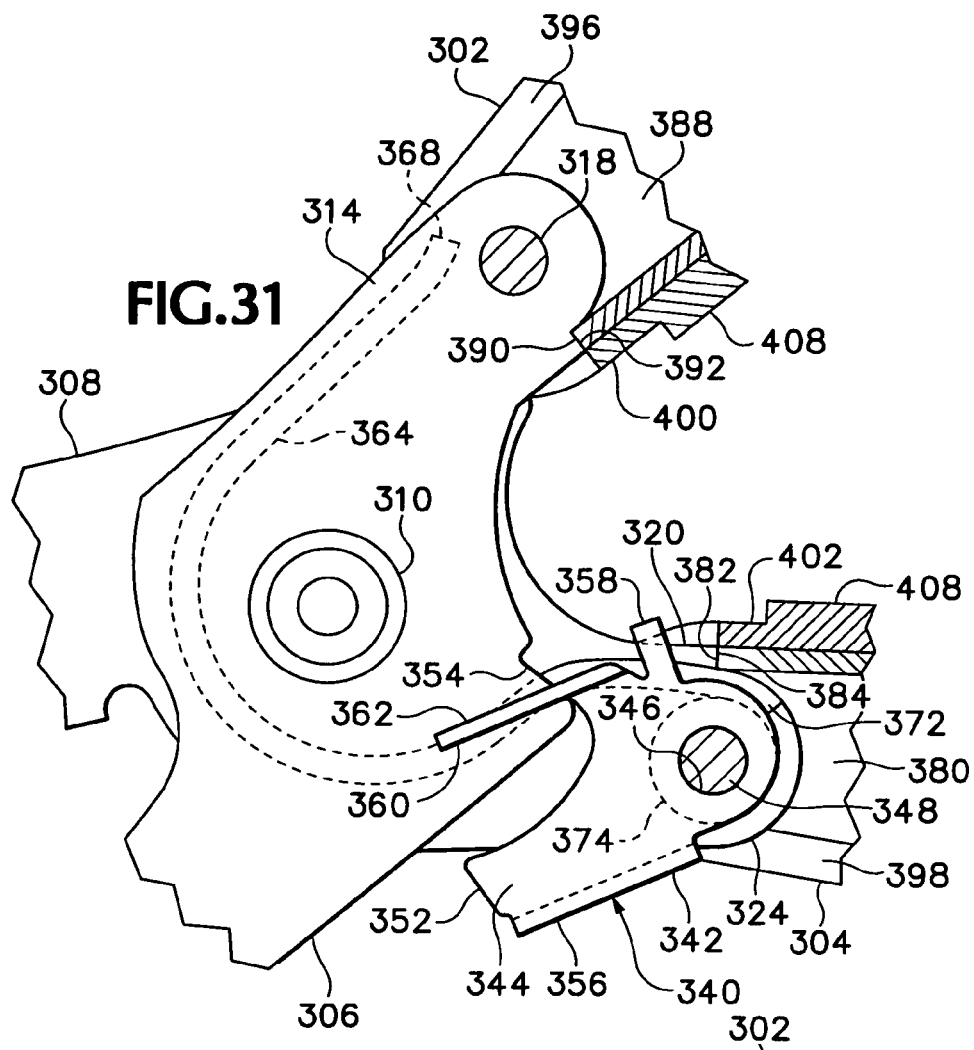
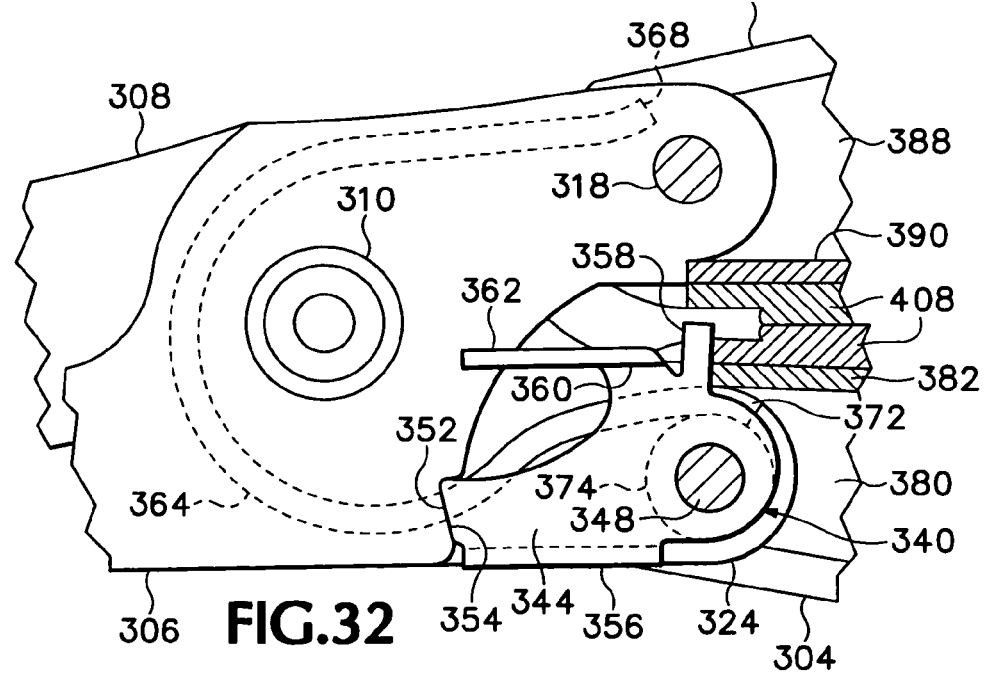

FOLDING MULTIPURPOSE TOOL WITH SHEARS AND COMFORTABLE HANDLES

CROSS-REFERENCE TO RELATED APPLICATIONS

This application is a continuation-in-part of pending application Ser. No. 10/791,589, filed Mar. 2, 2004.

BACKGROUND AND SUMMARY OF THE INVENTION

The present application relates to multipurpose hand tools that can be folded to a compact configuration, and particularly relates to such a tool including shears that are locked in a safe condition when the handles are closed, and whose handles are designed to be comfortable in use.

Multipurpose tools including shears and selected additional tools that can be folded into a compact configuration are known, and are available in various forms designed particularly for gardening or for use by bird hunters, for example. Previously known folding multipurpose tools designed for such uses, however, have not been particularly comfortable in use, and in some cases have required particular exercise of care to avoid injury from sharp edges of their blades.

What is desired, then, is a multipurpose tool that incorporates shears that can be folded into a safe, compact configuration, and that includes attractive and comfortable handles.

The present invention satisfies the aforementioned desires by providing a folding multipurpose tool as defined by the following claims.

In particular, one preferred embodiment of the invention includes a folding multipurpose tool including bypass shears including a jaw, a blade assembly including a blade carrier and a sharpened cutter mounted removably on the blade carrier, and handles connected to the jaw and to the blade carrier and movable between an extended, operative position of each and a folded position of each.

It is a feature of a folding multipurpose tool which is one embodiment of the invention that it includes a safety lock mechanism that latches the jaw and the blade assembly safely in a closed position in which the sharp edge of the cutter is not exposed, in response to folding the handles fully with respect to the jaw and blade assembly.

It is a feature of one embodiment of the invention that it provides a safety lock mechanism that latches a pair of blades safely in a closed position in which a sharp edge of a blade is not exposed, in response to folding the handles fully with respect to the blades.

It is a feature of another embodiment of the invention that at least one handle incorporates a strength member in the form of a channel having side walls and wherein such a handle includes molded cushioning portions attached to the side walls to provide for gripping the handle comfortably.

The foregoing and other features of the present invention will be understood more fully with reference to the following drawings and detailed description.

BRIEF DESCRIPTION OF THE DRAWINGS

FIG. 3 is a side elevational view of the tool shown in FIG. 1, taken from the same side as FIG. 1, with the handles folded around the shears.

FIG. 4 is a top plan view of the folded tool shown in FIG. 3.

FIG. 5 is a bottom plan view of the folded tool shown in FIG. 3.

FIG. 6 is a side elevational view of the folded tool shown in FIG. 3, taken from the opposite side.

FIG. 7 is an end elevational view of the folded tool shown in FIG. 3, taken from the left end of FIG. 3.

FIG. 8 is an end elevational view of the folded tool shown in FIG. 3, taken from the right end of FIG. 3.

FIG. 10 is a top plan view of the tool shown in FIG. 1.

FIG. 11 is a bottom plan view of the tool shown in FIG. 1.

FIG. 16 is an isometric view of a portion of the tool shown in FIG. 12, taken from the rear ends of the cutting blade assembly and jaw, and showing the handles in positions intermediate between extended and folded positions.

FIG. 17 is a partially cutaway view of a detail of the folding multipurpose tool shown in FIGS. 1-11, taken from the right side, with the handles thereof extended with respect to the blade assembly.

FIG. 27 is a side elevational view of a folding multipurpose garden tool which is an alternative embodiment of the present invention, shown with its handles extended, ready for use of the shears incorporated in the tool.

FIG. 28 is a partially cutaway side elevational view of the tool shown in FIG. 27, with the handles brought together and the shears locked in a closed position, and with one tool blade shown in its extended position with respect to one of the handles of the tool.

FIG. 29 is a side elevational view of the tool shown in FIG. 27, in a fully folded configuration, with the handles folded around the shears and the blades locked in a closed position.

FIG. 31 is a partially cutaway detail view of the blade pivot and handle pivots of the tool shown in FIG. 27, with the shears open as shown in FIG. 27.

FIG. 32 is a partially cutaway detail view of the blade pivot and handle pivots of the tool shown in FIG. 27, with the shears locked closed as shown in FIG. 28.

FIG. 40 is a sectional view of one of the handles of the tool shown in FIG. 27, taken along line 40-40 at an enlarged scale.

FIG. 41 is a sectional view of one of the handles of the tool shown in FIG. 27, taken along line 41-41 at an enlarged scale.

DETAILED DESCRIPTION OF THE PREFERRED EMBODIMENTS

Figure 1:
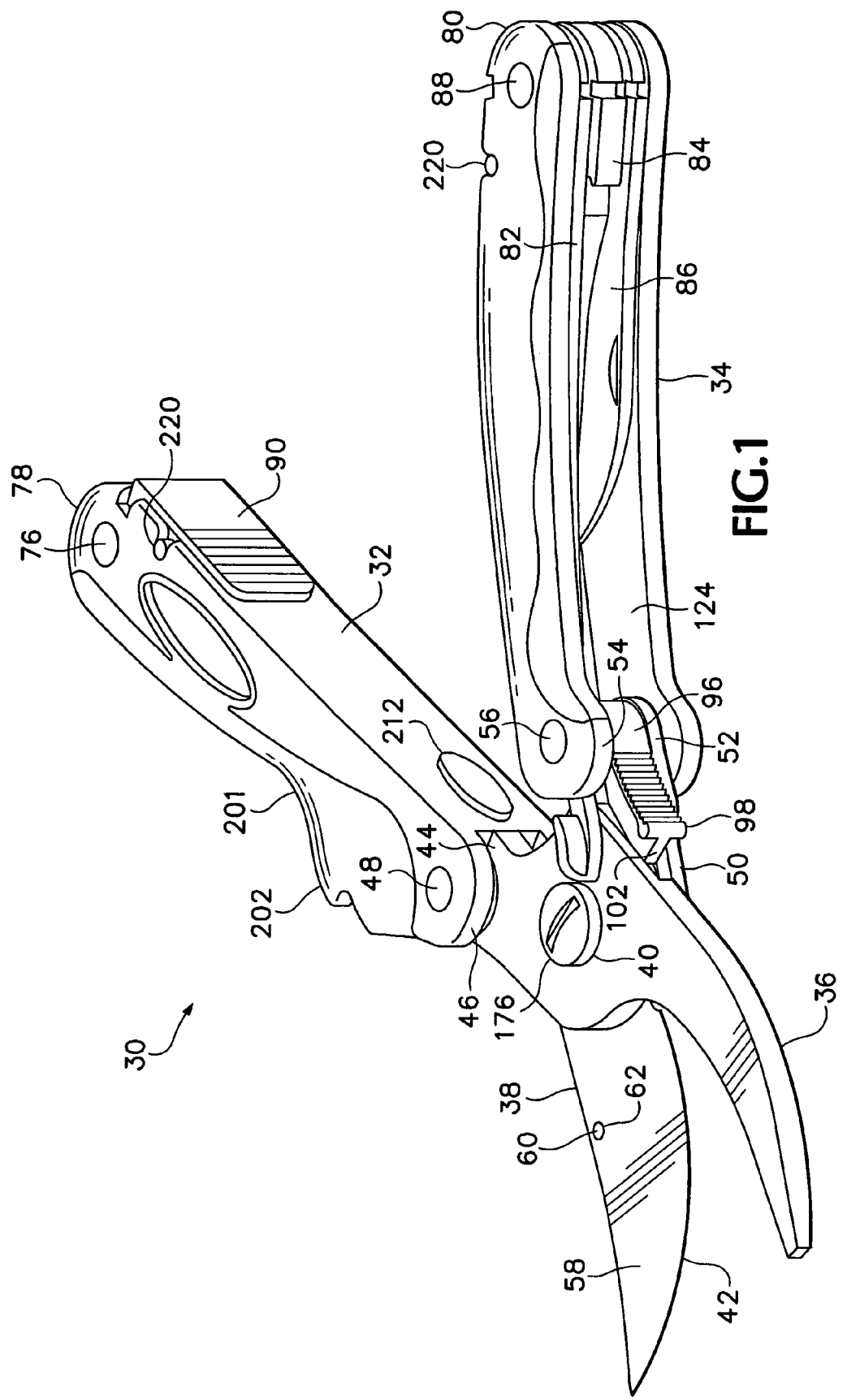
FIG. 1 is an isometric view from the lower left front of a folding multipurpose tool which is one embodiment of the present invention, shown with its handles extended, ready for use of the shears incorporated in the tool.

Referring now to the drawings forming a part of the disclosure herein, a folding gardener's multipurpose tool that is one preferred embodiment of the present invention is shown in FIG. 1. The tool 30 has a pair of handles 32 and 34 attached respectively to a jaw 36 and a cooperating cutting blade assembly 38 of a pair of pruning shears. The handles 32 and 34 have the general form of U-shaped elongate channels facing openly apart from each other as shown in FIG. 1 when they are extended.

The jaw 36 and the cutting blade assembly 38 are interconnected with each other and movable relative to each other about a blade pivot joint 40. Movement of the handles 32 and 34 toward each other causes the jaw 36 to move toward the blade assembly 38 about the blade pivot joint 40 in a scissors action. The jaw 36 is a bypass supporting jaw and supports a branch or other item being cut, as a sharp edge 42 passes closely alongside the jaw 36 in a bypass shears fashion in the tool 30. In another version of the tool the jaw 36 might instead include an anvil against which the sharp edge 42 could be brought to bear instead of passing by it.

Figure 2:
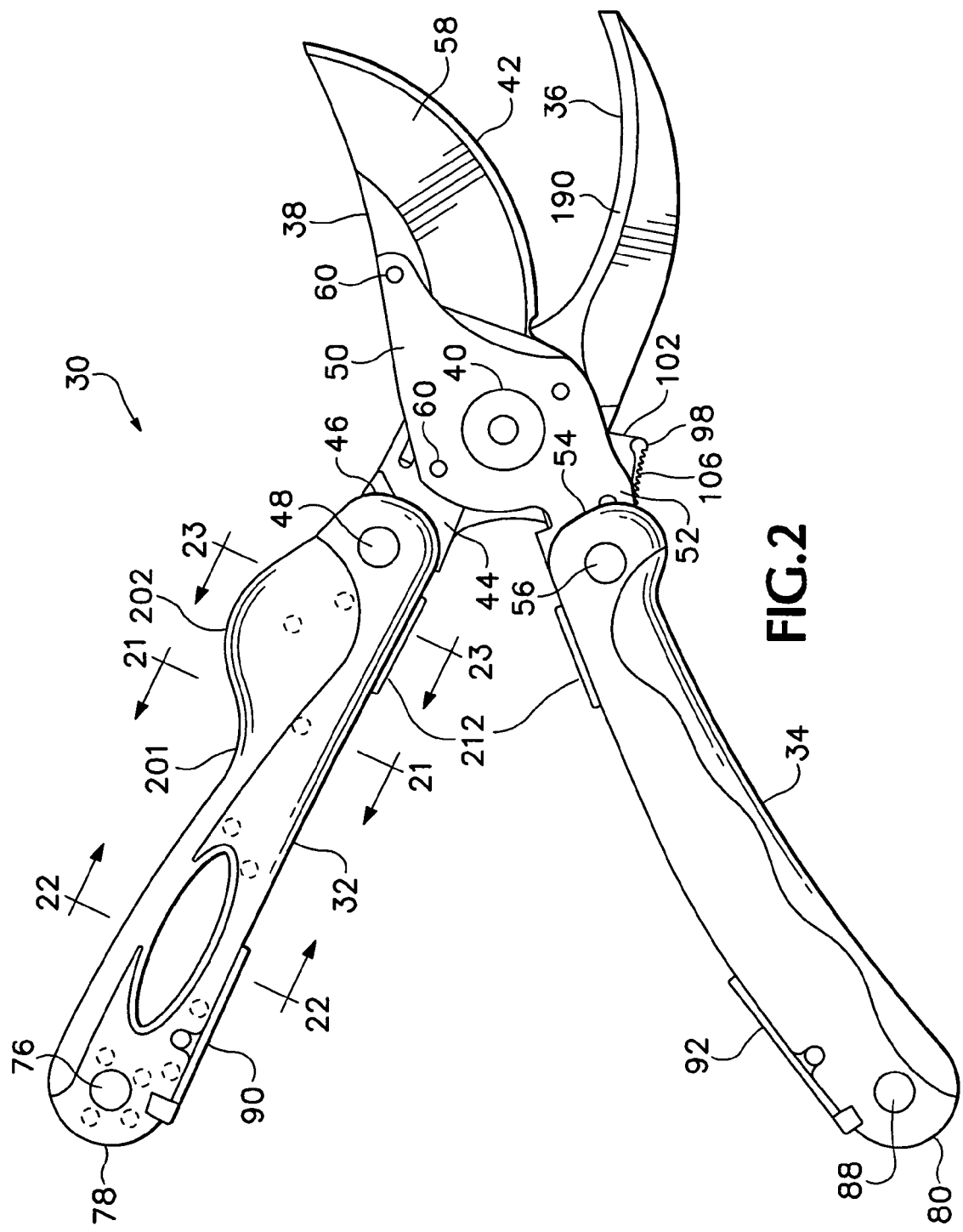
FIG. 2 is a side elevational view of the tool shown in FIG. 1, taken from the opposite, or right side.

Referring now also to FIG. 2, the jaw 36 has a base 44 attached to a front end 46 of the handle 32 by a handle pivot joint 48. The blade assembly 38 includes a blade carrier 50 that has a tang 52 attached to the front end 54 of the handle 34 by a handle pivot joint 56 including a pivot shaft 57. When the pruning shears of the folding multipurpose gardener's tool 30 are used, the handles 32 and 34 are in the extended positions shown in FIGS. 1 and 2 with respect to the jaw 36 and the blade assembly 38.

A replaceable cutter 58 including the sharp edge 42 is mounted on the blade carrier 50. The replaceable cutter 58 is coupled to and carried along with the blade carrier 50 by drive pins 60 mounted fixedly in the blade carrier 50 and engaged snugly but removably in corresponding holes 62 in the replaceable cutter 58. The cutter 58 can be removed and replaced by disassembling the blade pivot joint 40, allowing the replaceable cutter 58 to be lifted free from the pins 60. Ordinarily the pivot joint 40 holds the blade carrier 50 close enough to the jaw 36 so that the replaceable cutter 58 is held fly against the blade carrier 50.

When the shears are not to be used, the handles 32 and 34 can be pivoted about the handle pivot joints 48 and 56, respectively, to place the folding multipurpose gardener's tool 30 into a folded configuration shown in FIGS. 3, 4, 5, 6, 7, and 8, in which the handles 32 and 34 lie alongside each other and the jaw 36 and blade assembly 38 are housed within and between the handles 32 and 34.

Figure 9:
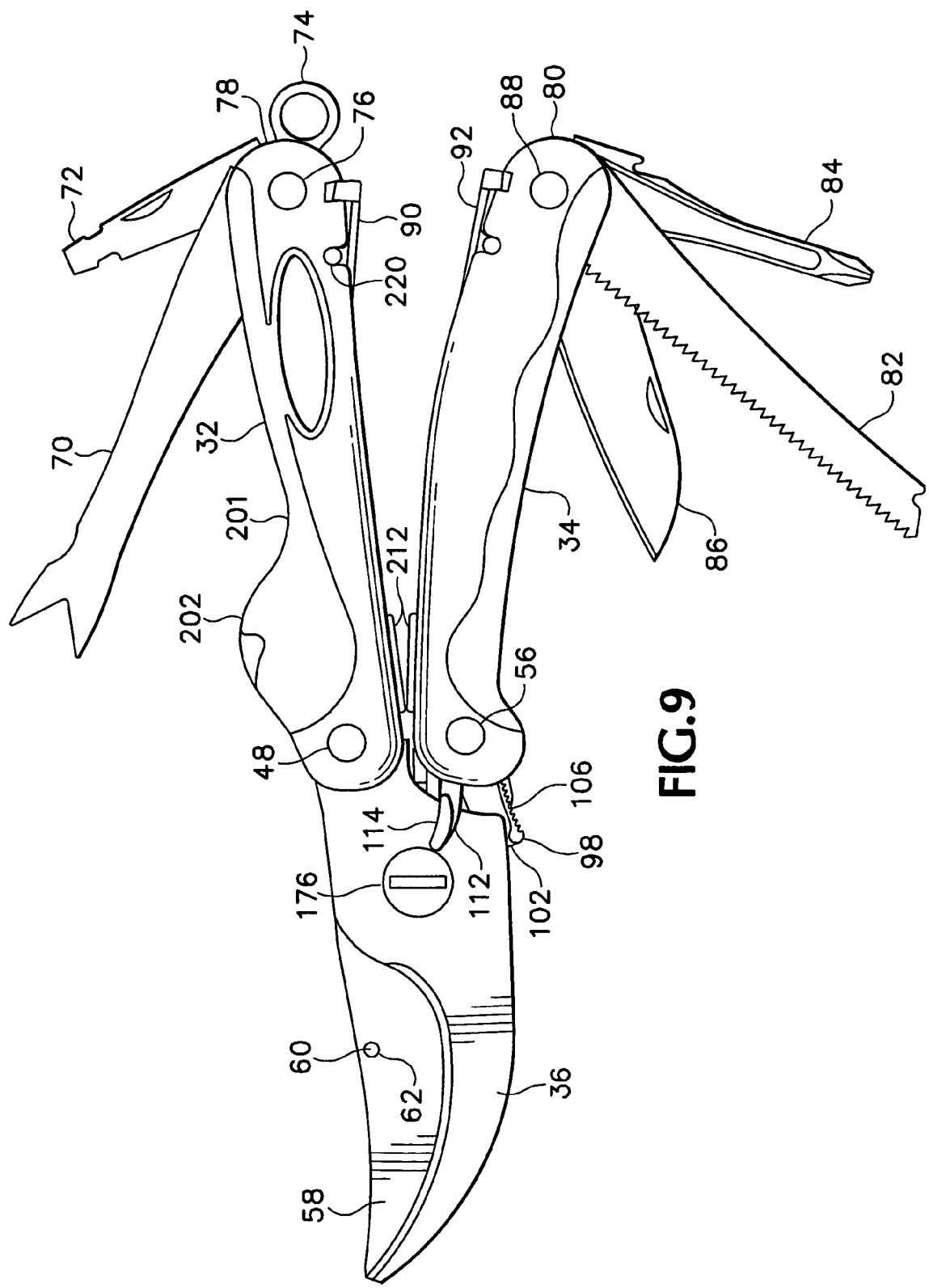
FIG. 9 is a side elevational view of the tool shown in FIG. 1, with the shears locked in a closed position and with several blades shown partially unfolded from their stowed positions in the handles of the tool.

Selected folding tool blades and bits are housed within each of the handles 32 and 34. In one embodiment of the folding tool 30, as shown in FIG. 9, the handle 32 houses a swallowtail weeder 70, a combination straight screwdriver and lawn sprinkler tool 72, and a lanyard attachment loop 74, all mounted on a blade pivot shaft 76 at the rear or outer end 78 of the handle 32. In the handle 34, at its outer end 80, are a saw blade 82, a Phillips screwdriver 84, and a knife blade 86, all mounted on a blade pivot shaft 88.

As shown in FIGS. 9, 10, and 11, each of the tool elements and blades 70, 72, 82, 84, and 86, as well as the lanyard loop 74, is movable about the respective pivot shaft 76 or 88 between a stowed position within the respective handle 32 or 34 and an extended, or deployed, position. Each tool blade is located on its respective pivot shaft 76 or 88 as by a spacer 87 or 89 so as to leave adequate space within the respective handle 32 or 34 for the jaw 36 and blade assembly 38 to be received within the handles 32 and 34 between the stowed tool blades in each handle. The spacers 87 and 89 also provide space to avoid accumulation of moisture or dirt that might cause corrosion on the tool elements and blades.

A selected one of the folding tool elements or blades can be held securely in its extended position by a latch mechanism controlled by a latch release lever 90 mounted on the handle 32 or a similar latch release lever 92 mounted on the handle 34, as shown in FIGS. 2, 9, 24, and 25.

Pruning Shears and Blade Safety Lock

When the handles 32 and 34 are extended with respect to the jaw 36 and the blade assembly 38, for the sake of safety it is desirable for the blade assembly 38 to be locked in place with respect to the jaw 36 when the shears are not actually being used, so that the sharp edge 42 is not exposed where it might injure a person accidentally. Accordingly, as shown in FIGS. 9, 12, 13, and 14, a blade safety lock mechanism designated generally by the reference numeral 96 can be engaged between the front end 54 of the handle 34 and the jaw 36, to hold the blade assembly 38 alongside the jaw 36.

Figure 12:
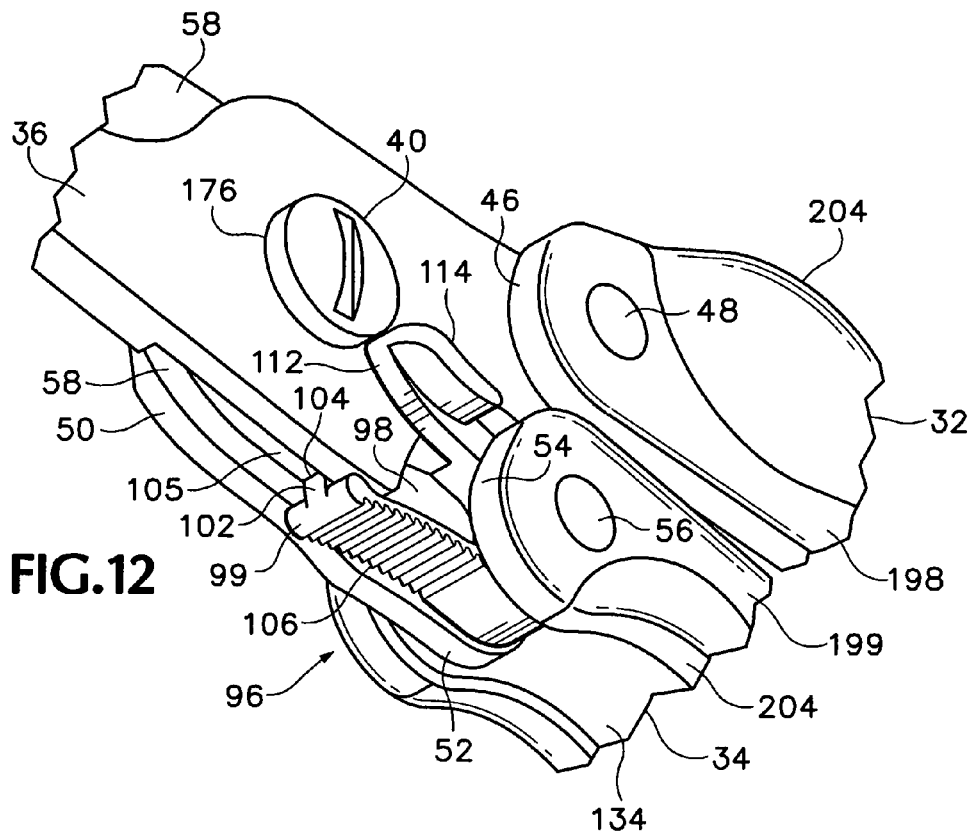
FIG. 12 is a detail view showing the front ends of the handles of a tool similar to that shown in FIGS. 1-11, with the blade safety lock keeping the blades in a closed condition.
Figure 13:
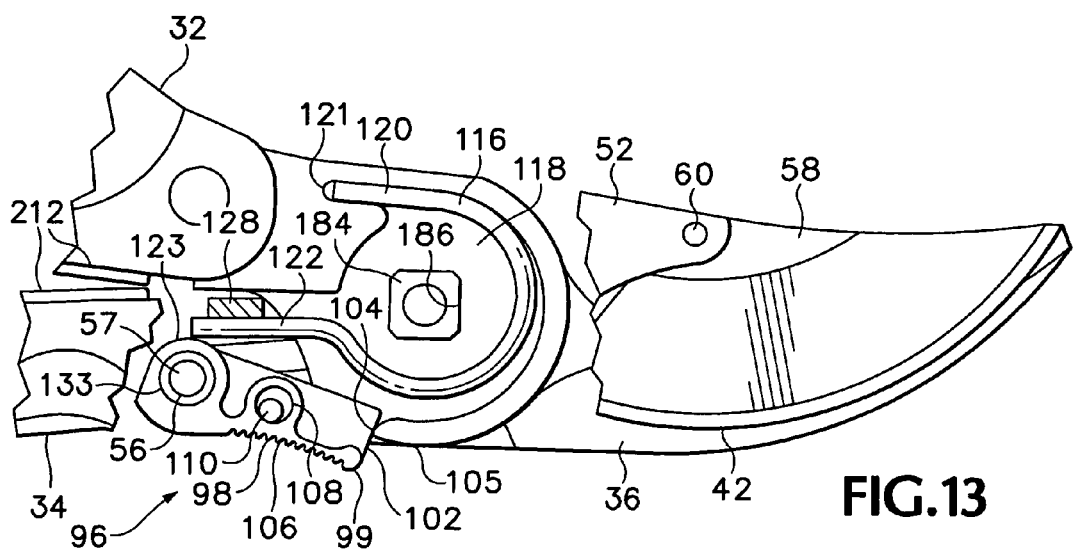
FIG. 13 is a partially cutaway side elevational view, taken from the right side of the tool shown in FIG. 12, showing the shears and front end portions of the handles of the tool.

The blade safety lock 96 includes a catch body 98 carried on a suitable pivot, and shown herein as mounted on the handle pivot joint 56. As shown in FIGS. 12 and 13, the catch body 98 has an outer end 99, and a pivot bore 100 is defined in the rear end of the catch body 98. The pivot shaft 57 of the handle pivot joint 56 extends through the pivot bore 100, permitting the catch body 98 to rotate through a small angle, between its position of engagement with the hub of the jaw 36 and a disengaged position shown in FIG. 14. As shown in FIG. 13, when the blade safety lock 96 is engaged, it holds the blade assembly 38 so that the sharp edge 42 is safely located alongside the flat side surface 190 of the jaw 36 and the handles 32 and 34 are close together.

As shown best in FIG. 13, a front face 102 of the catch body 98 engages a shoulder 104 defined along the peripheral surface 105 of the hub of the jaw 36 when the blade safety lock 96 is engaged. The catch body 98 can be engaged with the jaws 36 by pressing on a thumb pad 106 when the handles 32 and 34 are held close together, in the position shown in FIG. 9. The thumb pad 106 preferably has a non-slip surface configuration such as narrow parallel ridges and grooves. The range of angular motion of the catch body 98 about the handle pivot joint 56 is limited by the free space available within an opening 108 defined in the catch body 98 and surrounding a pin 110 extending from the tang 52 of the blade carrier 50. It will be understood that if desired, the catch body 98 might instead be mounted so as to pivot about, for example, the pin 110, and have its range of motion limited by its relationship with a part of the handle pivot joint 56.

A release lever 112 is attached to the catch body 98 and extends forward from the handle pivot joint 56, alongside the hub of the jaw 36. The release lever 112 has a thumb pad 114 spaced apart from the thumb pad 106 of the catch body 98 by an angle of, for example, about 35°, about the handle pivot joint 56 in the tool shown. The angle is not critical but is preferably chosen to place the thumb pad 114 conveniently for use. The thumb pad 114 is thus located, as may be seen in FIGS. 9 and 12, in a position where it is easily engaged by the thumb of a person's right hand grasping the handles 32 and 34 of the tool 30 in a normal fashion for use of the pruning shears. The tool 30 could also be made in a mirror-image left handed version (not shown).

Figure 14:
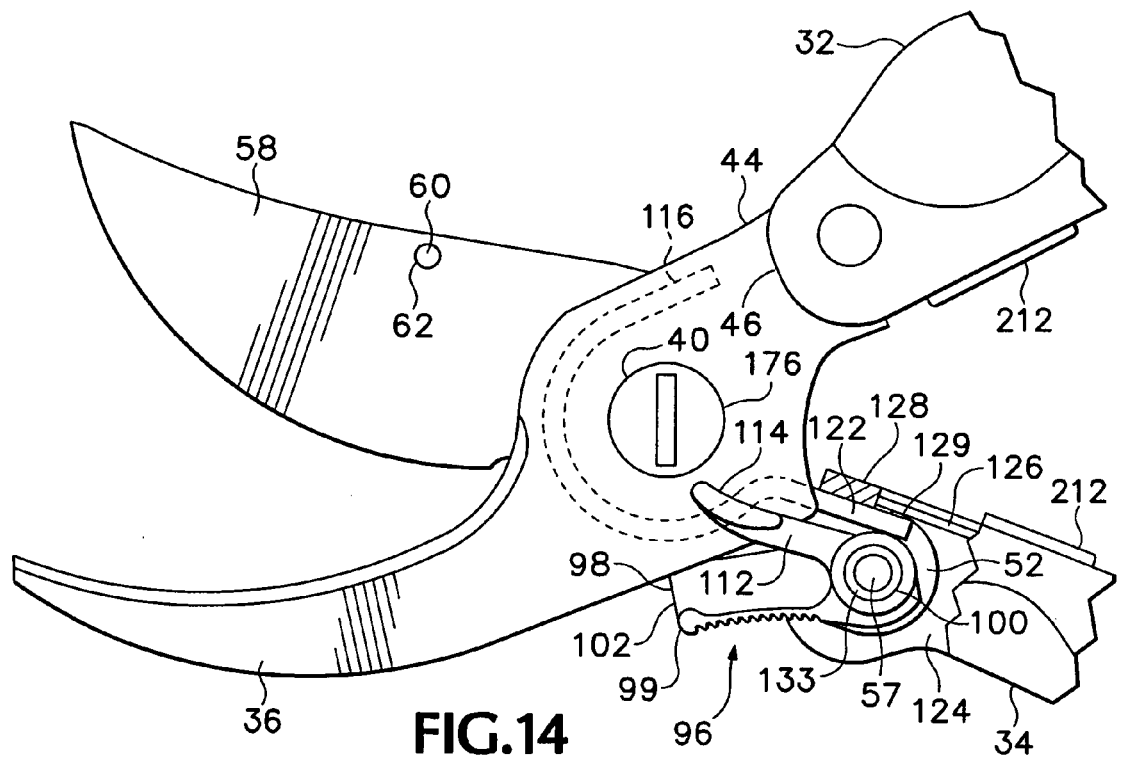
FIG. 14 is a partially cutaway left side elevational view of the cutting blade and jaw of the tool shown in FIG. 12, together with front end portions of the handles, with the shears in an open position.

As shown in FIGS. 13 and 14, a blade-opening spring 116 is housed in a cavity 118 defined around the blade pivot joint 40 in the hub of the jaw 36. A first end 120 of the spring 116 is held by being engaged in a groove 121 extending away from the cavity 118 into the base 44 of the jaw 36. A main part of the spring 116 extends arcuately about the blade pivot joint 40, and an opposite end 122 extends away from the hub of the jaw 36 toward the front end 54 of the handle 34 and presses against the surface 123 of the hub of the catch body 98, as shown in FIG. 13. Alternatively, the end 122 might press on an appropriate shoulder or other perch (not shown) on the tang 52. The spring 116 when in place is bent elastically and urges the tang 52 of the blade assembly 38 to pivot away from the base 44 of the jaw 36 about the blade pivot joint 40, thus also urging the handles 32 and 34 apart from each other.

The blade safety lock 96 can be engaged by pushing the thumb pad 106 to urge the front face 102 of the catch body 98 into its latching position alongside the shoulder 104 while holding together the handles 32 and 34. When the handles 32 and 34 are then released, the spring 116 urges the jaw 36 to rotate about the pivot joint 40 with respect to the blade assembly 38, bringing the shoulder 104 tightly against the front face 102. Friction then retains the catch body 98 in its engaged position, shown in FIG. 13, or the front face 102 and the shoulder 104 may be slightly sloped as shown in FIG. 13, so as to latch with each other by cam action, to keep the jaw 36 and blade assembly 38 closely alongside each other.

When it is desired to release the blade safety lock 96, pressure can conveniently be applied to the thumb pad 114, using the thumb of the hand holding the tool 30. A normal one-handed grip squeezing the handles 32 and 34 together while pushing on the thumb pad 114 will tend to counter the force of the blade-opening spring 116, thus releasing pressure of the front face 102 on the shoulder 104 and facilitating movement of the catch body 98 to remove the front face 102 from its position of interference with the shoulder 104. The blade assembly 38 is then free to move away from the jaw 36 toward the position shown in FIG. 14.

Figure 15:
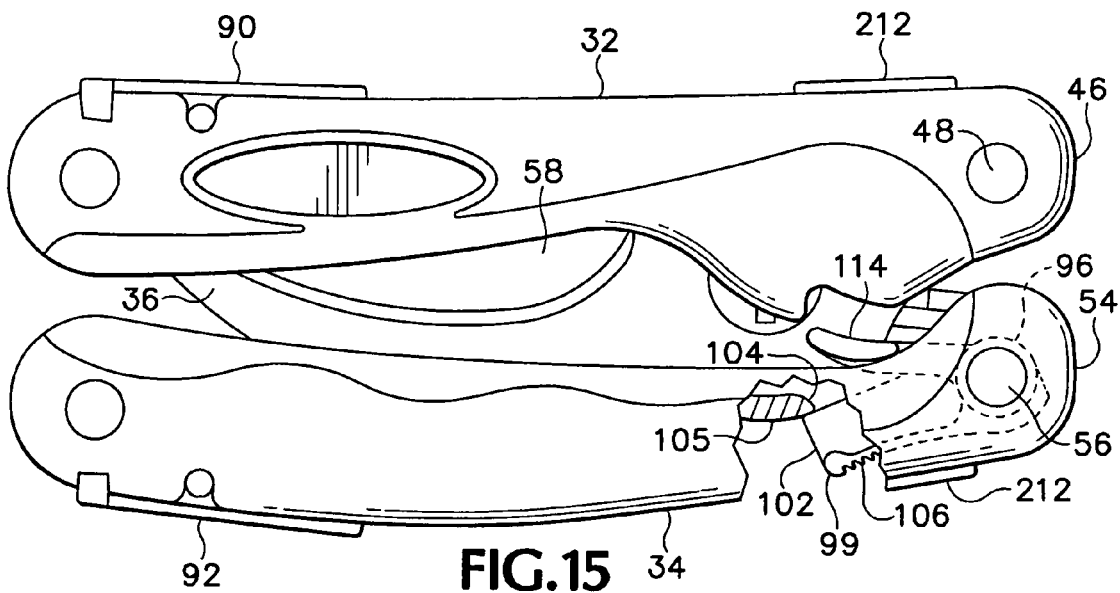
FIG. 15 is a partially cutaway view similar to that of FIG. 3, but with the handles not fully closed and the blade safety lock not fully engaged.
Figure 18:
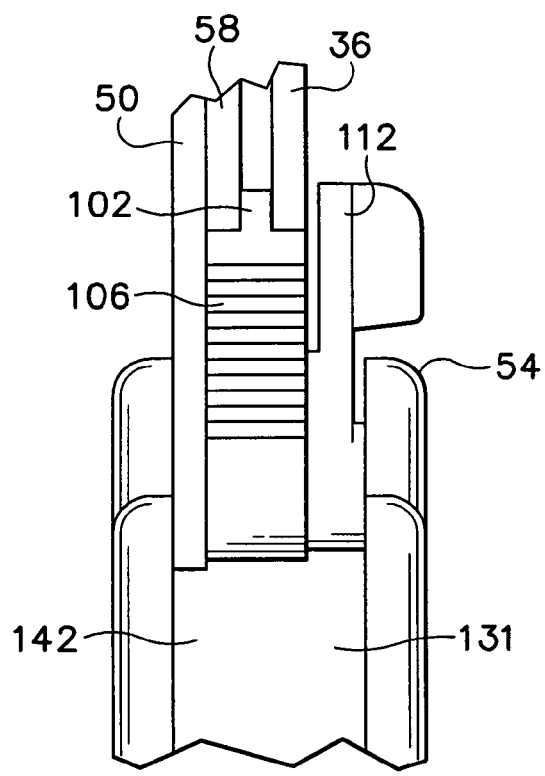
FIG. 18 is a detail view of the tool shown in FIG. 17, taken in the direction indicated by line 18-18 in FIG. 17.

In one preferred embodiment of the folding multipurpose gardener's tool 30, as shown in FIG. 15, the action of moving the handles 32 and 34 toward their folded configuration, to house the jaw 36 and blade assembly 38 between and within the channels defined by the handles 32 and 34, engages the blade safety lock 96. When the handles 32 and 34 are nearly folded about the pivot joints 48 and 56, the handles 32 and 34 squeeze the jaw 36 and the blade assembly 38 together, and the resulting pressure of the interior of the handle 34 against the catch body 98 urges it toward the blade pivot joint 40. The outer end 99 of the catch body 98 follows the peripheral surface 105 of the outside of the jaw 36 until the front face 102 reaches a point where it moves into the cavity 118 and engages the shoulder 104. As this happens, the handles 32 and 34 free to move from being slightly separated, as shown in FIG. 15, to the fully folded configuration shown in FIG. 3. Once the tool 30 is in the fully folded configuration shown in FIG. 3, the blade lock 96 is engaged. Thereafter, the handles 32 and 34 can safely be moved apart from each other about the handle pivot joints 48 and 56 to extend the handles 32 and 34 with respect to the jaw 36 and blade assembly 38 without the blade assembly 38 moving relative to the jaw 36 and exposing the sharp edge 42.

Referring again to FIGS. 13 and 14 and also referring now to FIG. 16, in one embodiment of the folding multipurpose tool 30, the tang 52 of the blade carrier 50 is mounted rotatably on the pivot shaft 57 of the handle pivot joint 56 alongside the catch body 98. The handle 34 and the tang 52 rotate with respect to each other during movement of the handle 34 between its position of extension with respect to the blade assembly 38, shown in FIG. 1, and the folded configuration of the multipurpose tool 30, shown in FIG. 3.

Referring to FIG. 16, the handle 34 preferably includes a channel 124 of formed sheet steel as its main strength member. With the handle 34 extended with respect to the blade assembly 38 during use of the pruning shear, force exerted on the handle 34 is transferred into the blade assembly 38 through the handle pivot joint 56 and through the base 126 of the U-shaped channel member 124, acting against a leg 128 extending from the main portion of the tang 52 of the blade carrier 50.

The leg 128 is aligned with an abutment face 130 of the base 126 of the channel 124, located at the front end 54 of the handle 34. Preferably, the blade carrier 50 is made of suitable sheet metal cut to the appropriate shape, as by fine blanking, after which the leg 128 may be bent to the appropriate angle with respect to the remainder of the blade carrier 50, to align the leg 128 with the abutment face 130, as shown in FIGS. 14 and 16.

Figure 20:
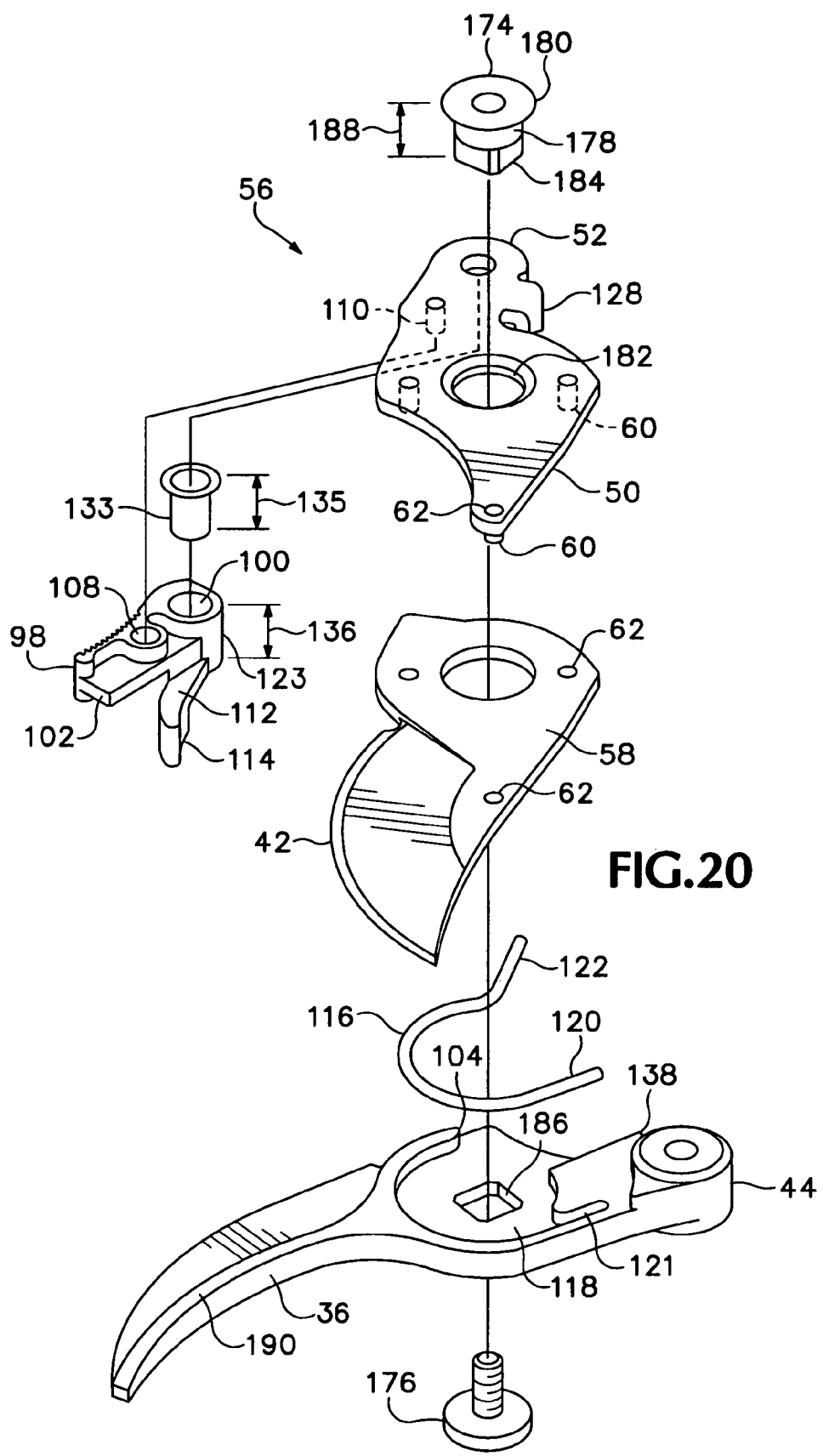
FIG. 20 is an exploded isometric view of the jaw and the blade assembly of the tool shown in FIG. 1.

Friction may be provided to help prevent the handle 34 from rotating too freely with respect to the tang 52 by adjusting the tension in the pivot shaft 57 of the handle pivot joint 56, which may, for example, be a screw-fastened hollow pin. To keep the latch body 98 free to be moved as desired to engage or disengage the blade safety lock 96, a spacer sleeve 133, seen best in FIG. 20, is provided in the pivot joint 56 between the tang 52 and the opposite side wall 125 of the channel 124. The spacer sleeve 133 fits on the pivot shaft 57 of the pivot joint 56, and fits inside the pivot bore 100 loosely enough for the catch body 98 to rotate freely. It has a length 135 slightly greater than the width 136 of the catch body 98. The catch body 98 thus is kept free to move on the spacer sleeve 133 between the side walls 125, and the spacer sleeve 133 holds the tang 52 securely in place against one of the side walls 125 and properly aligned with the handle 34.

Figure 19:
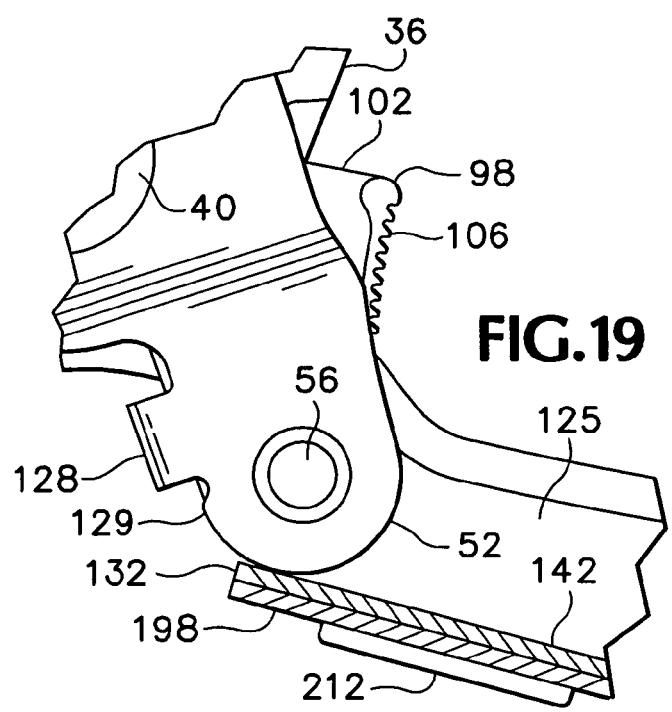
FIG. 19 is a fragmentary view similar to a portion of FIG. 17, showing a handle in a partially folded position with respect to the blade assembly.

Additional friction may be provided to keep the handle 34 in its extended position with respect to the tang 52 of the blade carrier 50 by providing a wedge-like or cam-like protrusion 129, best seen in FIGS. 16, 17, and 19, on the tang 52 in position to press against the interior surface of the base 126 of the channel 124 as the handle 34 approaches being fully extended.

As may be seen best in FIG. 16, a metal channel member 131 that is the main strength member of the handle 32 has an abutment face 132 adjacent the front end 46 of the base portion 142 of the metal channel 131 of the handle 32, and the base 44 of the jaw 36 is mounted on the handle pivot joint 48 between the side walls 134 of the channel 131. The jaw 36 is preferably of metal and may be made as a casting or by powder metallurgy methods in order to minimize machine work necessary to provide the required shape. Its base 44 includes a boss substantially filling the space between the side walls 134. A shoulder 138 is provided on the base 44, to engage and be supported by the abutment face 132 when the handle 32 is extended with respect to the jaw 36, in order to transfer forces from the handle 32 into the jaw 36. A wedge-like or cam-like protrusion 140 shown best in FIG. 16 may also be provided on the base 44 of the jaw 36 where it will engage the interior of the channel base portion 142 with friction sufficient to prevent the handle 32 from rotating about the handle pivot joint 48 unless it is definitely desired to fold the handle 32 with respect to the jaw 36.

Replaceable Cutter

As mentioned previously, the blade or cutter 58 is easily replaceable when damaged and may easily be removed to permit sharpening when dulled through long use, and may then easily be remounted on the blade carrier 50. The pruning shear portion of the tool 30 is shown in FIG. 20, without its handles and associated additional blades, in an exploded view showing the cutter or blade 58 separated from the blade carrier 50, with the blade pivot joint 40 disassembled.

The blade pivot joint 40 preferably incorporates a pivot axle including a nut or female portion 174 and an adjustment screw 176. A circular shank 178 and a radial flange 180 at an outer end of the female portion 174 are received rotatably in a corresponding pivot bore 182 defined in the blade carrier 50. Preferably the pivot bore 182 is counterbored to receive the flange 180, and the shank 178 and flange 180 should be easily rotatable in the bore 182. The opposite or inner end portion 184 of the female portion 174, in contrast, although small enough to pass through the bore 182, is not circular, but is square or of another shape which can be held non-rotatably in a corresponding hole 186 in the hub of the jaw 36, to prevent rotation of the female portion 174 with respect to the hub portion of the jaw 36. The hole 186 receives the inner end portion 184 of the female portion 174 but preferably substantially prevents rotation of the female portion 174 with respect to the jaw 36. As a result, the screw 176, once tightened into the female portion 174, is not subjected to rotary oscillation tending to loosen it from the female portion 174 as the pruning shear is used. The angular movement of the blade carrier 38 with respect to the jaw 36 is supported substantially entirely by the rotation of the blade carrier 52 with respect to the female portion 174. Additionally, the female portion 174 is preferably constructed as a locknut, as by including a Nylon plug, a setscrew, or another device to engage the threads of the screw 176.

The length 188 of the female portion 174 of the pivot axle of the blade pivot joint 40 is chosen to permit adjustment of the blade pivot joint 40 to achieve a desired amount of tension by tightening the adjustment screw 176 to the appropriate distance into the female portion 174 while the end portion 184 remains non-rotatably engaged in the hole 186 in the hub of the jaw 36. Adjustment of the pivot axle in this fashion can thus account for cutters 58 of different thicknesses, wear of the planar face 190 of the jaw 36, against which the replaceable cutter 58 moves, and for wear of parts in contact with each other in the rotational relationship between the flange 180, shank 178, and pivot bore 182 in the blade carrier 50. The properly tightened pivot axle also holds the blade carrier 50 tightly against the adjacent side of the replaceable cutter 58, thus keeping the pins 60 engaged in the holes 62 to drive the cutter 58 during use of the pruning shear. It will be recognized that the pivot axle could be arranged oppositely, as well, with the same result.

Handle Comfort

Figure 21:
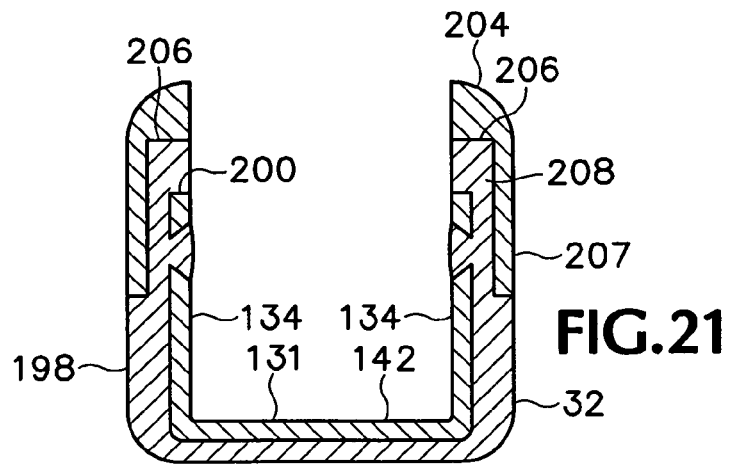
FIG. 21 is a section view of one of the handles of the tool shown in FIGS. 1-11, taken along line 21-21 in FIG. 2.
Figure 22:
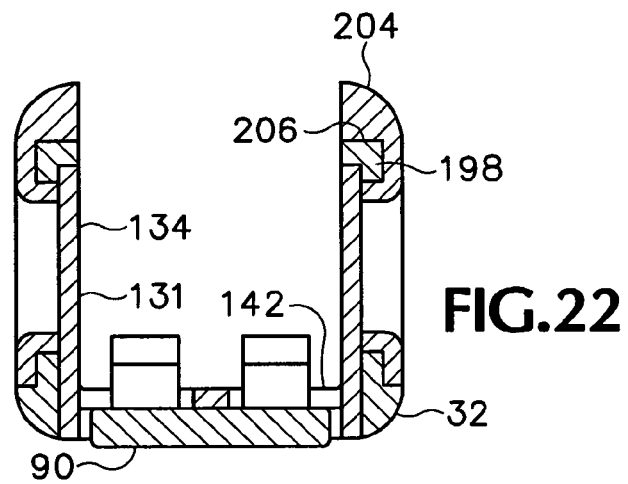
FIG. 22 is a section view of one of the handles of the tool shown in FIGS. 1-11, taken along line 22-22 of FIG. 2.
Figure 23:
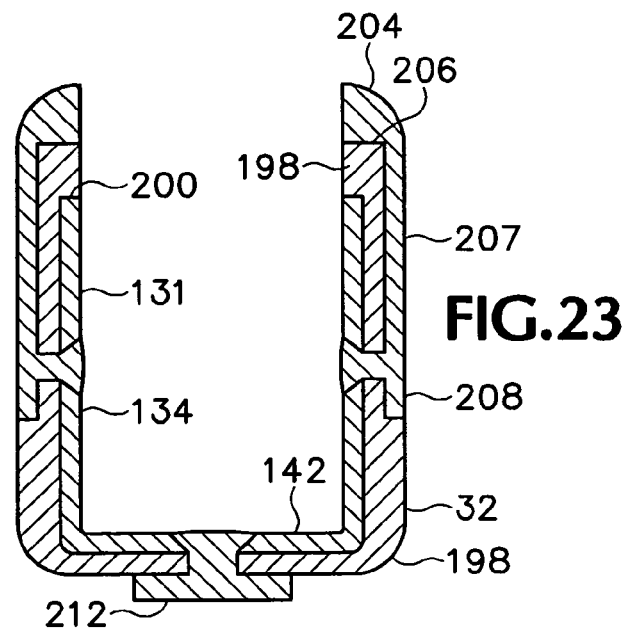
FIG. 23 is a section view of one of the handles, taken along line 23-23 of FIG. 2.

Referring again to FIGS. 1, 2, 10, and 11, and also referring to FIGS. 21-23, the handles 32 and 34 have a generally U-shaped channel configuration, and are constructed to have sufficient strength and attractive appearance, and to be comfortable in use of the shear.

The inner channel frame member 131 is part of the handle 32, and a similar channel frame member 124 is part of handle 34. The channel 131 includes a channel base portion 142 and a pair of parallel side wall portions 134. The side wall portions 134 extend the entire length of the handle 32 and support a molded shell portion 198 as an intermediate handle portion fitting around the channel member 131 and interlocking with margins 200 of the side walls 134 of the channel member 131. A shell portion 199 of similar construction, although different in shape, is used in the handle 34, as shown in FIG. 12.

The shell portions 198 and 199 of the handles 32 and 34 are preferably molded of a suitable rigid, strong, thermoplastic material such as a fiber-reinforced or glass-filled Nylon that is easily molded to provide a desired shape and adequate strength and that may be provided in a desired color for attractive appearance of the tool including such an intermediate handle portion.

The side walls of the handle 32 are tapered in profile, from the rear end 78 to a shallowest point 201, adjacent which is a hump 202 to support the user's grip. The side walls of the handle 34 are also tapered in profile, from its outer end 80 toward its front end 54.

A respective comfortable cushioning portion including a grip cushioning layer 204 extends along each of the outer margins 206 of the shell layers 198 and 199 as a cushioning portion of each handle 32 and 34. The grip cushioning layer 204 is preferably made of a tough, yet resiliently soft and rubber-like thermoplastic elastomeric material such as those available from Advanced Elastomer Systems, of Akron, Ohio, under the trademark Santoprene®. A portion 207 of the comfortable grip cushioning layer also extends along and covers a portion of an outer face 208 of the shell portion 198. The grip cushioning layer portion 204 is preferably attached to the channel member 131 or 124 and the shell layer 198 or 199 by chemical bonding and adhesion resulting from the process of molding and by being shaped to interlock mechanically with the shell layer 198 or 199 at certain places. For example, openings may be provided in the side portions of the shell layer 198 or 199, and the side walls 134 and 125 to provide for mechanical interlocking, as shown with respect to the handle 32 in FIGS. 21, 22, and 23.

Near the front ends 46 and 54 of the handles 32 and 34, a cushioning limit stop 212 of structure similar to the cushioning layer 204 is provided on each of the handles 32 and 34, as shown in FIGS. 4 and 23 with respect to handle 32. The limit stops 212 engage each other as the handles 32 and 34 approach each other during use of the shears when the blade assembly 38 is alongside the jaw 36, as shown, for example, in FIG. 9. These stops 212 prevent the handles 32 and 34 from being squeezed too tightly together and also protect the user's hands from unnecessary and undesirable shock as the cutter 58 finally passes through an object such as a thick branch being cut by the pruning shear.

The handles 32 and 34 are preferably assembled by first placing the respective channel member 124 or 131 in a suitable mold cavity and then molding the shell layer 198 or 199 onto the channel member 131 or 124. The channel member and molded layer 198 or 199 are then placed into a second mold cavity and the elastomeric material forming the cushioning layer 204 and the limit stop 212 is overmolded into place. Conventional molding methods are used to provide both mechanical and chemical bonding among the channel members 124 and 131 and the molded parts 198, 199, 204, and 212.

Figure 24:
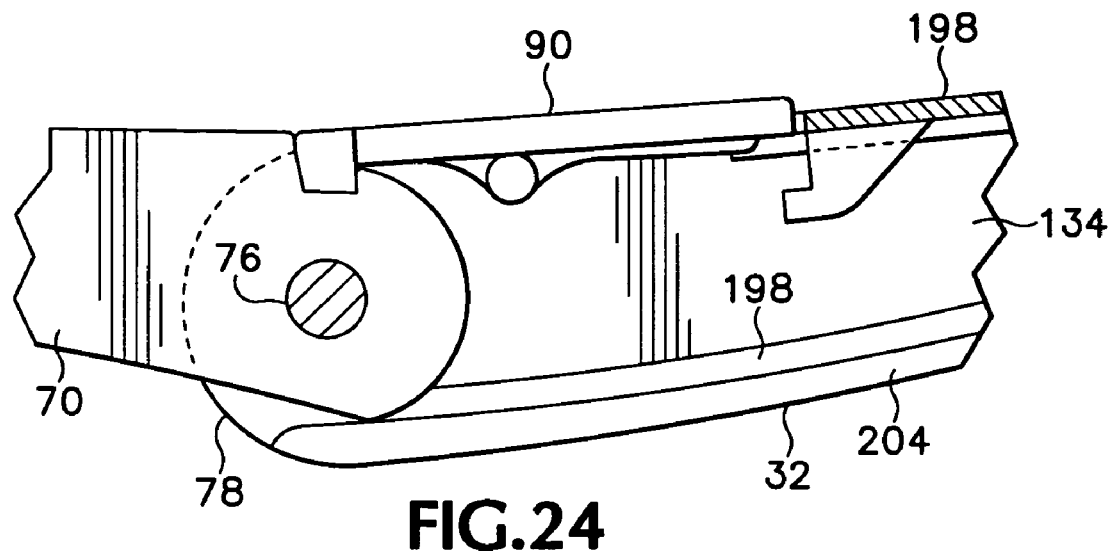
FIG. 24 is a partially cutaway detail view of one of the handles of the multipurpose tool shown in FIGS. 1-11, showing the weeder locked in its extended position.
Figure 25:
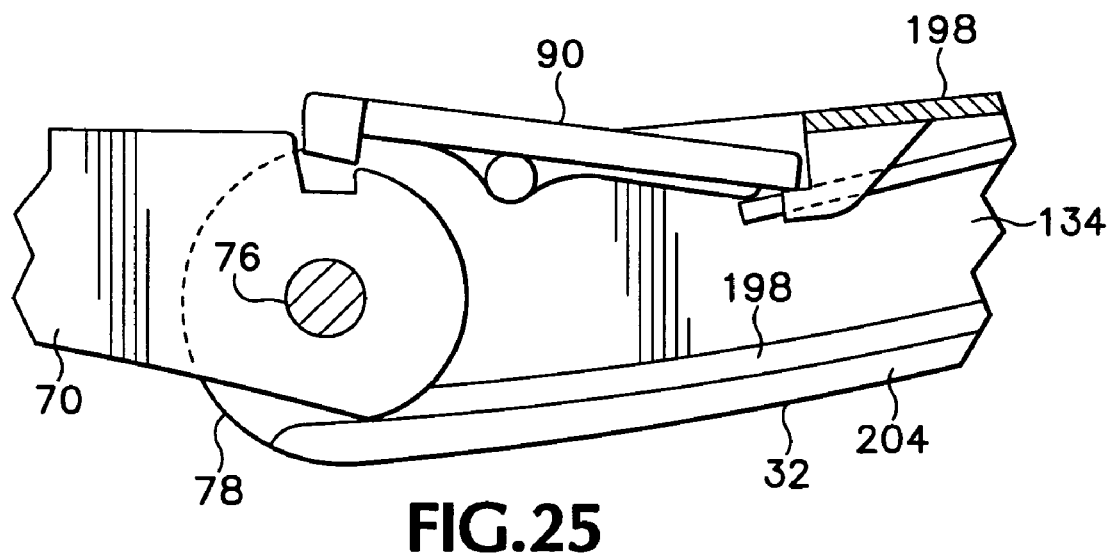
FIG. 25 is a view similar to FIG. 24, showing the latch release lever pressed to a position for releasing a folding tool element or blade from its extended position.

A tool blade member mounted pivotably within one of the handles 32 and 34 at its outer end 78 or 80 may be held securely in its extended position by the action of a latch mechanism including the respective latch lever 90 or 92 attached to the main channel member 131 or 124 of the respective handle by a respective latch lever pivot 220. The handle 32 and latch release lever 90 are shown in FIGS. 9, 24, and 25, and the latch mechanisms are similar in the handle 34. The latch levers 90 or 92 are preferably cast or formed by powder metallurgy methods.

As the latching mechanisms do not form a part of the present invention, they are not described in detail herein.

Figure 26:
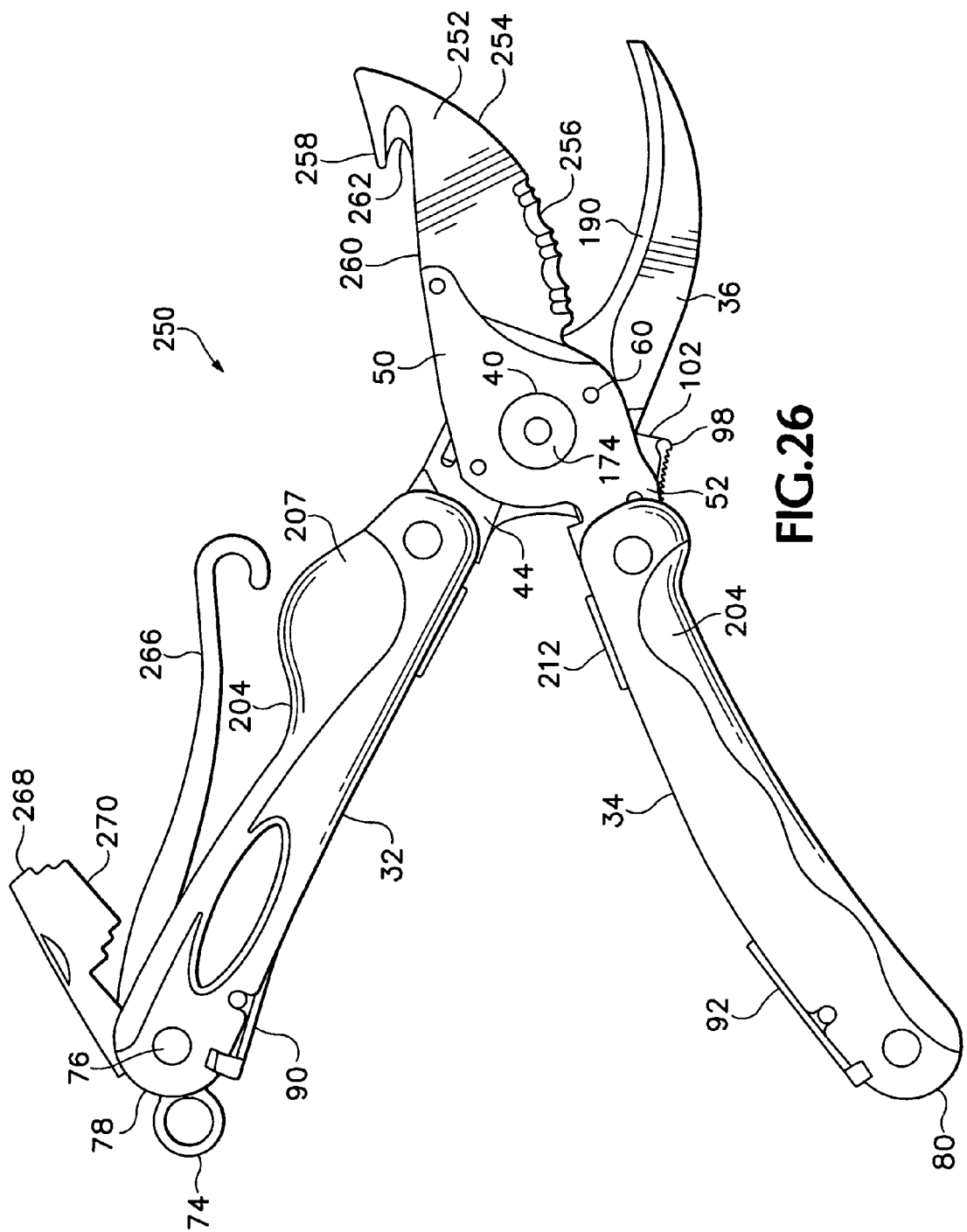
FIG. 26 is a view of a multipurpose folding tool particularly suited for use by hunters, taken in the same direction as FIG. 2 and showing a pair of folding tool elements particularly intended for use by hunters in a partially open position.

A folding multipurpose tool 250 shown in FIG. 26 is more particularly adapted for convenient use by a hunter instead of a gardener, and includes a different embodiment of some aspects of the invention. The tool 250 is in most respects similar to the folding multipurpose gardener's tool 30, and like parts are indicated by the same reference numerals as used above in connection with the tool 30. The tool 250 has a blade assembly equipped with a replaceable cutter 252 whose sharpened edge includes a gently curved front portion 254 and may include serration in a rear portion 256. Both edge portions 254 and 256 are located to operate cooperatively with the jaw 36 as a cutting blade of a pair of shears. The replaceable cutter 252 also includes a hook 258 extending outward from its back 260. The hook 258 includes a sharpened edge 262 in its throat, useful in skinning game or for other uses such as cutting twine or opening bags of fertilizer or the like, if the replaceable cutter 252 were included in a gardener's tool instead of the replaceable cutter 58.

Folding tools stowed selectively in the handle 32 of the tool 250 include a slender hook 266, useful in removing entrails from game birds and small animals. Also included is a screwdriver blade 268 that carries a shotgun choke tube tool 270.

Other specialized blades or tool elements might be provided in one or the other of the handles 32 and 34 in such a multipurpose folding tool 30 or 250 to make the tool particularly useful for other special purposes.

It will also be understood that instead of the combination of the pruning shears jaw 36 and blade assembly 38, the handles 32 and 34 might be used for other pivotally interconnected jaws or blades such as those of pliers, sheet metal shears, or other scissors-like cutting tools.

Alternative Embodiment

Referring next to FIGS. 27-41, a folding gardener's multipurpose tool 300 is an alternative embodiment of the present invention. The tool 300 has a pair of handles 302 and 304 attached respectively to a pair of blades, shown here as a jaw 306 and a sharp cutting blade 308 of a pair of pruning shears. The handles 302 and 304 have the general form of U-shaped elongate channels facing openly apart from each other as shown in FIGS. 27 and 28 when they are extended with respect to the blades.

The jaw 306 and the sharp blade 308 are interconnected with each other and movable relative to each other about a blade pivot joint 310 held together by an adjustable screw 311 threaded into a boss defined on the jaw 306, while a working part of each blade extends forward from the blade pivot joint 310. Movement of the handles 302 and 304 toward each other causes the jaw 306 to move toward the blade 308 in a scissors action about the blade pivot joint 310. The jaw 306 is a bypass supporting jaw and supports a branch or other item being cut, as a sharp edge 312 of the cutting blade 308 passes closely alongside the jaw 306 in a bypass shears fashion.

The jaw 306 has a base 314 attached to a front end 316 of the handle 302 by a handle pivot joint 318. The cutting blade 308 also has a base, referred to herein as a tang 320, attached to the front end 322 of the second handle 304 by a handle pivot joint 324. When the pruning shears of the tool 300 are used, the handles 302 and 304 are in the extended positions shown in FIGS. 27 and 28.

Figure 39:
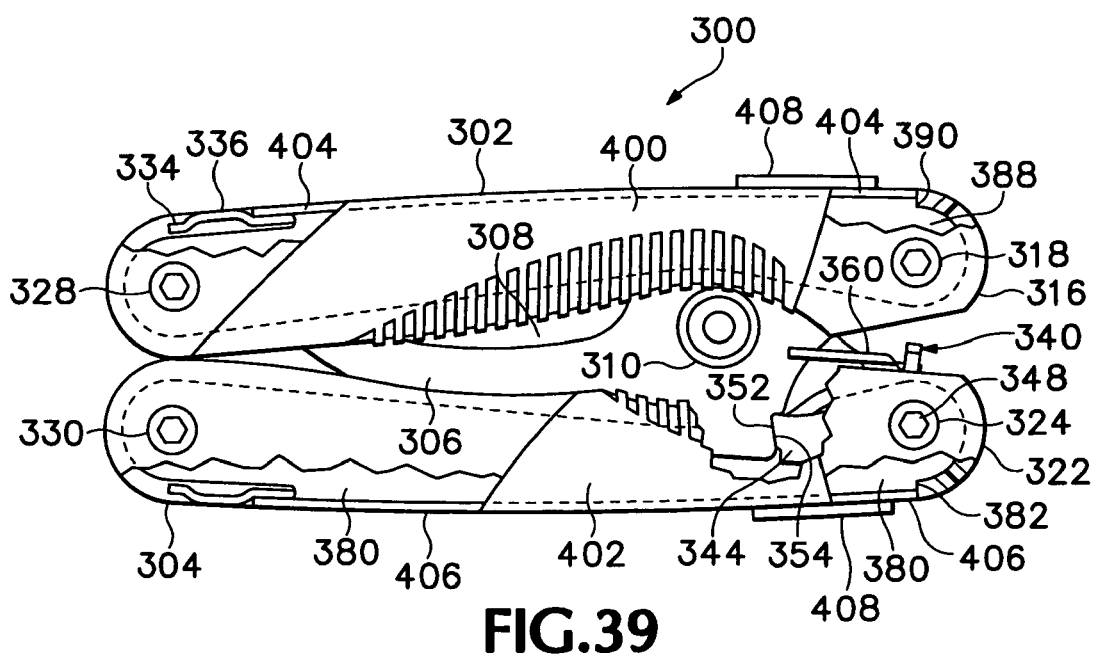

As in the folding tool 30, when the shears of the folding gardener's tool 300 are not to be used, the blades can be locked closed and the handles 302 and 304 can be pivoted about the handle pivot joints 318 and 324, respectively, to place the folding multipurpose gardener's tool 300 into a folded configuration shown in FIGS. 29 and 39, in which the handles 302 and 304 lie alongside each other and the jaw 306 and cutting blade 308 are housed within and between the handles 302 and 304.

Referring to FIG. 28, selected tool elements and blades may be housed in each of the handles 302 and 304 and movable about a respective pivot shaft 328 or 330 between a stowed position and an extended, or deployed, position. For example, a weeder blade 70 shown partially in FIG. 28 can be held securely in its extended position by a catch 334 carried on a spring 336, or by a latch mechanism such as that described above in connection with the multipurpose gardener's tool 30. The spring 336 may be formed as an extension of the base of the metal channel of the handle 304, and the weeder 70 or other tool may include a notch 338 in its base to receive the catch 334 when the tool is extended. Alternatively, other types of blade locks known in the art and common to the industry may be substituted.

When the handles 302 and 304 are extended with respect to the jaw 306 and the cutting blade 308, for the sake of safety it is desirable for the cutting blade 308 to be locked in a closed position with respect to the jaw 306 when the shears are not actually being used, so that the sharp edge 312 is not exposed where it might injure a person. Accordingly, as shown in FIGS. 28, 30, 31, and 32, a blade safety lock mechanism designated generally by the reference numeral 340 can be engaged from the handle 304 to the jaw 306, to hold the cutting blade 308 alongside the jaw 306.

The blade safety lock 340 includes a catch body 342 carried on a suitable lock pivot. The lock pivot may be incorporated into the handle pivot joint 324, or may have a separate and independent pivot location. As shown in FIGS. 31 and 32, the catch body 342 has a forward or outer end 344, and a pivot bore 346 is defined in the rear end of the catch body 342. The handle pivot joint 324 includes a shaft 348 that extends through the pivot bore 346, permitting the catch body 342 to rotate about the axis of the handle pivot joint 324 through a small angle, between a position of engagement in a notch in the heel of the jaw 306, shown in FIGS. 28, 32, and 35, and a disengaged position shown in FIGS. 31 and 33. As shown in FIG. 28, when the blade safety lock 340 is engaged, it holds the jaw 306 so that the sharp edge 312 of the cutting blade 308 is safely located alongside the flat side surface 350 of the jaw 306 and the handles 302 and 304 are close together.

Figure 30:
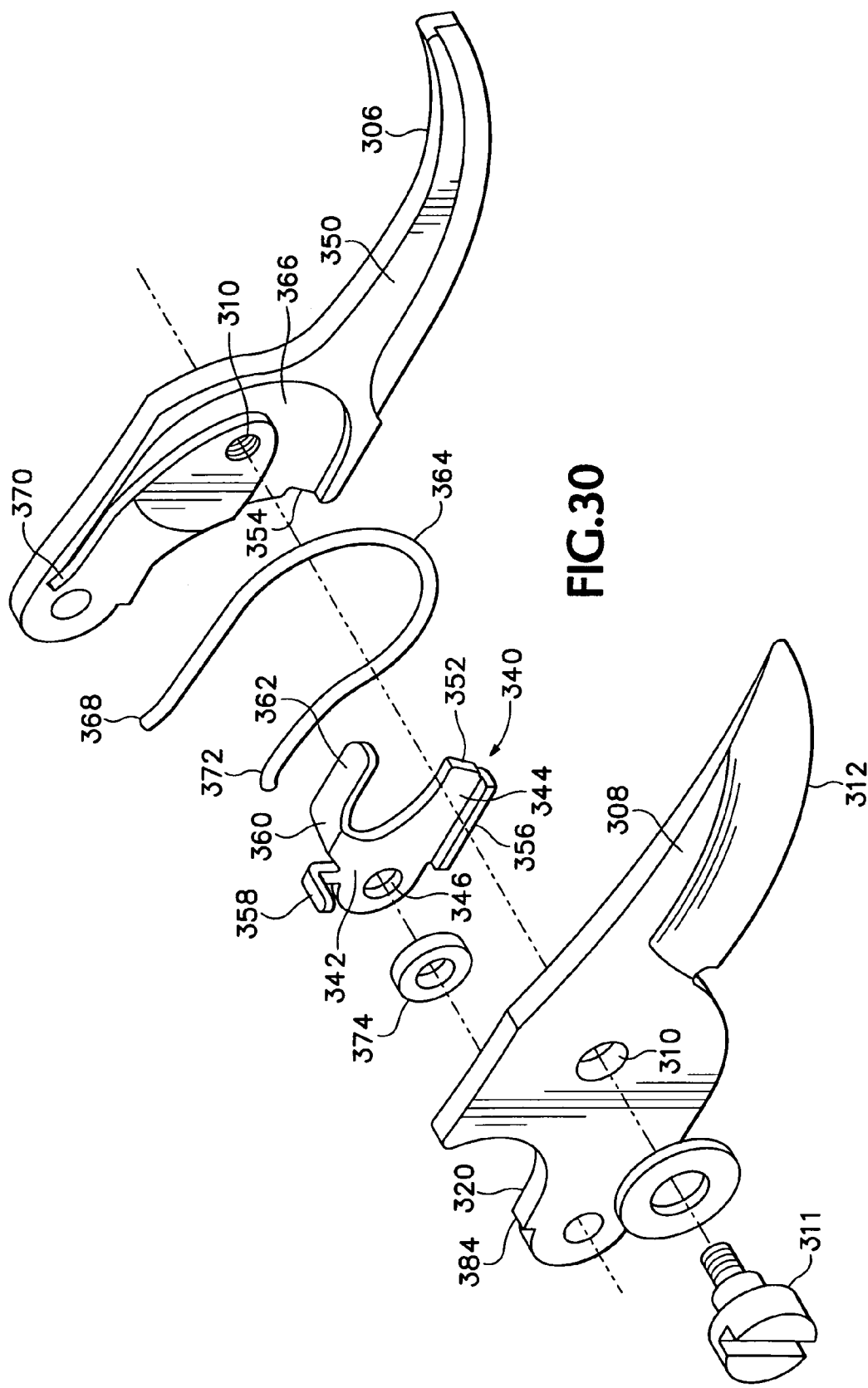
FIG. 30 is an exploded isometric view of the blades and the safety lock of the tools shown in FIGS. 27, 28, and 29, taken from the upper right front of the tool.

As shown best in FIG. 30, the catch body 342 may be of sheet metal die cut and bent to the required form, or alternately may be cast or molded from metal or other suitably rigid material. When the blade safety lock 340 is engaged, a front face 352 of the catch body 342 engages a notch 354 defined by the peripheral surface of the heel of the jaw 306. The range of angular motion of the catch body 342 about the pivot shaft 348 is limited by a finger 358 extending laterally over the tang 320 of the cutting blade 308. The catch body 342 can be engaged with the jaw 306 by pressing on a thumb pad 356 when the handles 302 and 304 are held close together, in the position shown in FIG. 28. When the handles 302 and 304 are then released, the spring 364 urges the jaw 306 to rotate about the blade pivot joint 310 with respect to the cutting blade 308, bringing the front face 352 tightly into the notch 354. Friction may then retain the catch body 342 in its engaged position, or the front face 352 and the notch 354 may be slightly angled as shown best in FIG. 32, so as to latch with each other by cam action, to keep the jaw 306 and cutting blade 308 closely alongside each other. The thumb pad 356 is formed as a narrow flange extending laterally along the catch body 342 and also functions to stiffen the front end 344 of the catch body 342.

A release lever 360 extends laterally from the catch body 342 and forward from the pivot bore 346, alongside the hub portion of the jaw 306. The release lever 360 has a thumb pad surface 362 spaced apart from the thumb pad 356 of the catch body 342 by a distance chosen to place the thumb pad conveniently for use to rotate the catch body counterclockwise as seen in FIGS. 28 and 32 to release the front face 352 from engagement with the notch 354 in the jaw 306. Alternately, thumb pad 356 may be omitted and the release lever 360 could serve both functions.

Figure 33:
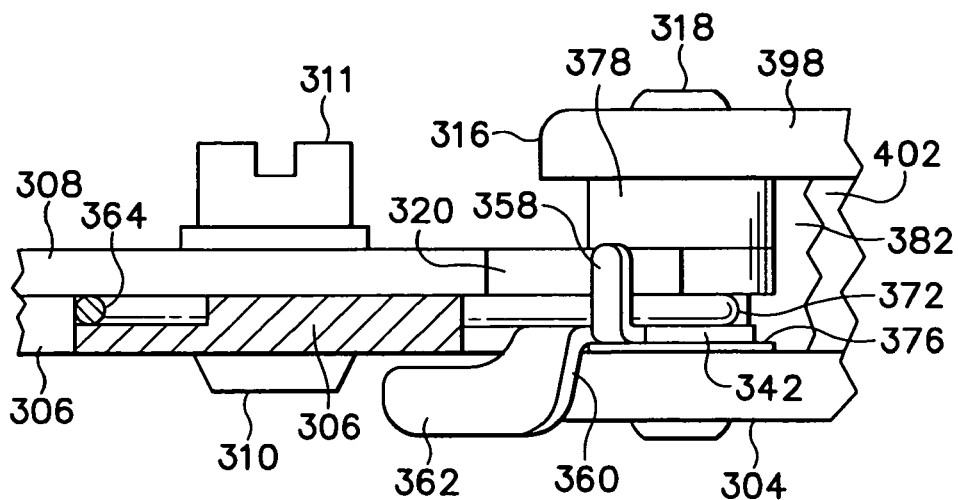
FIG. 33 is a sectional view of a detail of the tool shown in FIG. 27, taken along line 33-33, at an enlarged scale.

As shown in FIGS. 30, 31, and 32, a blade-opening spring 364 is housed in a cavity 366 defined in the jaw 306, around the blade pivot joint 310. A first end 368 of the spring 364 is held by being engaged in a groove 370 extending away from the cavity 360 into the base 314 of the jaw 306. A main part of the spring 364 extends arcuately about the blade pivot joint 310, and an opposite end 372 extends away from the pivot joint 310 toward the front end 322 of the handle 304 and presses against a peripheral surface of a washer-like spacer 374 located on the pivot shaft 348 alongside the catch body 342, as shown in FIGS. 31, 32, and 33. The ends 368 and 372 of the spring 364 are curved to fit in place and resist slipping out of place during use of the tool 300. The spring 364, when in place, is bent elastically and urges the tang 320 of the blade 308 to pivot away from the base 314 of the jaw 306 about the blade pivot joint 310, thus also urging the handles 302 and 304 apart from each other. Other spring mechanisms known in the art may be substituted. For example, interfacing arcuate recesses could be cut into each of jaws 306 and 308, and a coil compression spring located within the recesses could provide the desired spring force.

When it is desired to release the blade safety lock 340, pressure can conveniently be applied to the thumb pad 362, using the thumb of the hand holding the tool 300. A normal grip, squeezing the handles 302 and 304 together while pushing on the thumb pad 362, will tend to counter the force of the blade-opening spring 364, thus releasing pressure of the front face 352 in the notch 354 and facilitating movement of the catch body 342 to remove the front face 352 from its position in the notch 354. The blade 308 is then free to move away from the jaw 306 toward the position shown in FIGS. 27, 31, and 33. A washer 376 of a suitable material is located alongside the catch body 342 to keep it free from unnecessary friction.

The finger 358 limits the counterclockwise movement of the catch body 342 by encountering the tang 320 as shown in FIG. 27. Alternatively, other features to limit the counterclockwise movement may be utilized, such as a boss, notch, abutment, or the like. The front end 344 of the catch body 342 is forced into contact with the bottom of the jaw 306, as shown in FIG. 31, when the jaw 306 moves open and its heel comes into contact with the catch body 342 at the base of the release lever 360, moving the catch body 342 clockwise. The catch body 342 thus limits the angle to which the jaw 306 and the blade 308 can open apart from each other about the blade pivot joint 310.

A spacer 377 in the handle pivot joint 318 and a spacer 378 in the handle pivot joint 324 keep the jaw 306 and the cutting blade 308 located in the same side of the handles 302 and 304, leaving room for tools pivoted on shafts 328 and 330 at the opposite end of the handles.

Figure 34:
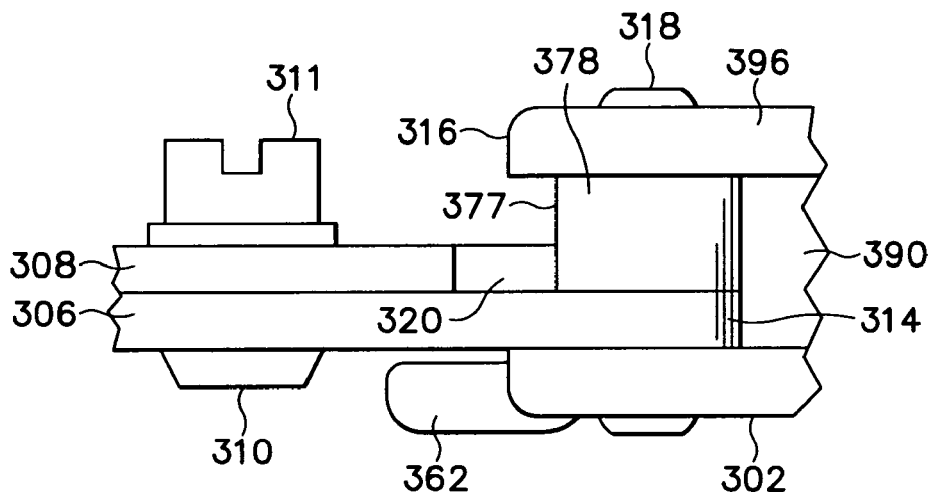
FIG. 34 is a top plan view, at an enlarged scale, of a detail of the tool shown in FIGS. 27 and 28, taken in the direction indicated by line 34-34 of FIG. 28.
Figure 35:
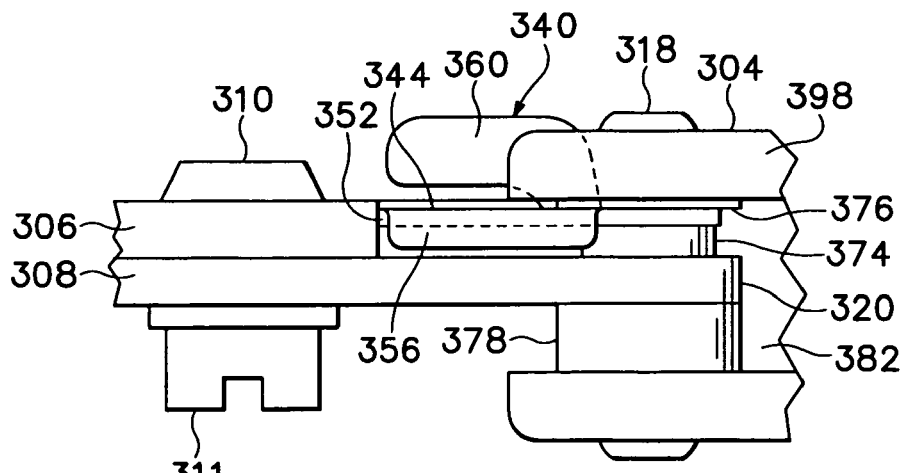
FIG. 35 is a bottom plan view, at an enlarged scale, of a detail of the tool shown in FIGS. 27 and 28, taken along line 35-35 of FIG. 28.

As shown in FIG. 34, when the jaw 306 and cutting blade 308 are locked in the closed position the thumb pad 362 of the release lever 360 is exposed to be pressed to release the blade safety lock 340. When the handles 302 and 304 are squeezed together the thumb pad 356 on the catch body 342 is available to be pressed into its locking position of engagement against the shoulder 354 at the heel of the jaw 306, as shown in FIG. 35.

Figure 36:
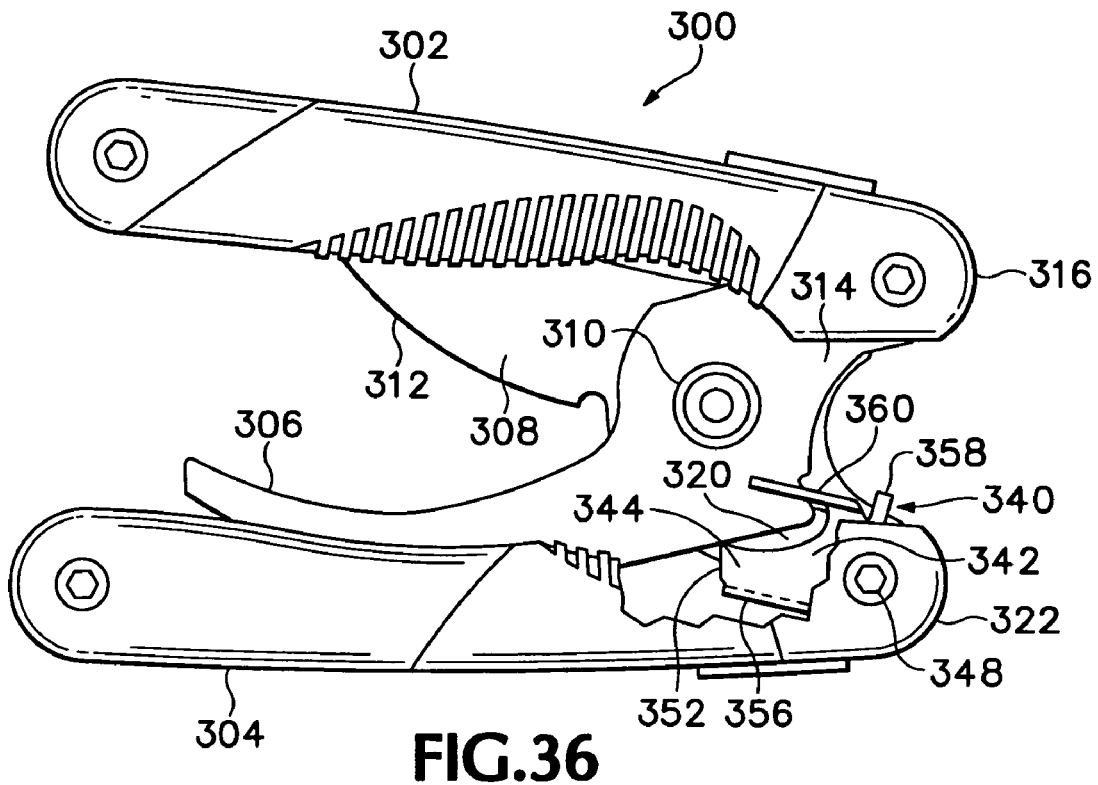
FIGS. 36, 37, 38, and 39 are partially cutaway side elevational views of the tool shown in FIGS. 27 and 29, with the handles folded toward the folded configuration with respect to the blades and showing the cooperative interaction between parts of the tool and the included safety lock during automatic locking of the blades while folding the tool.
Figure 37:
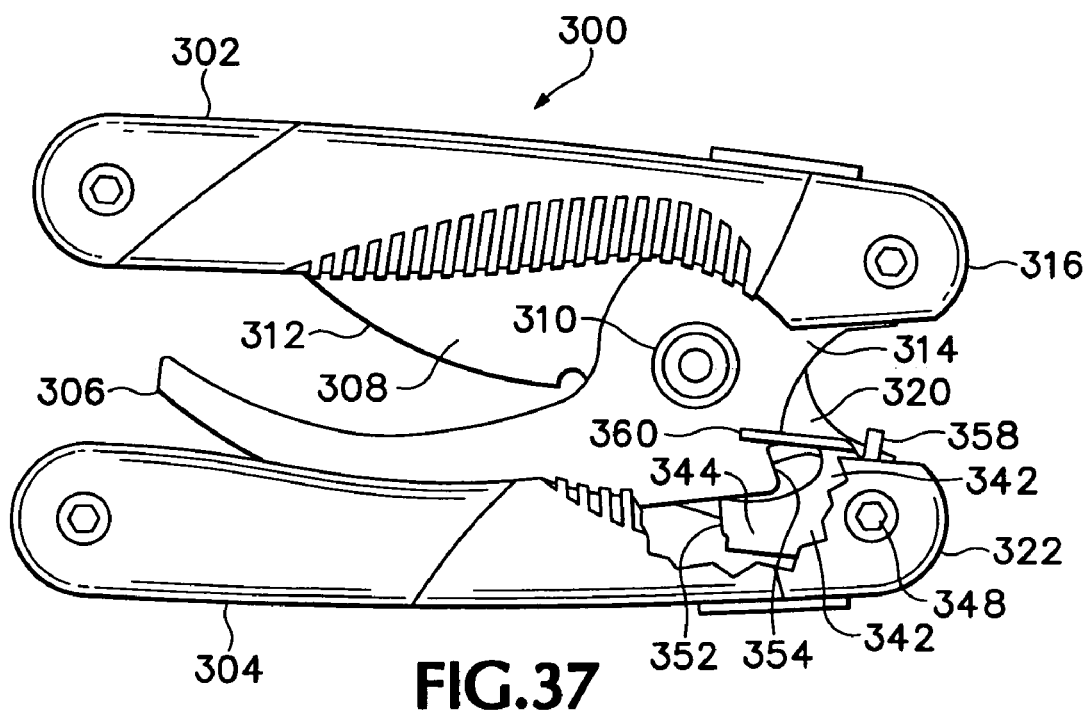
Figure 38:
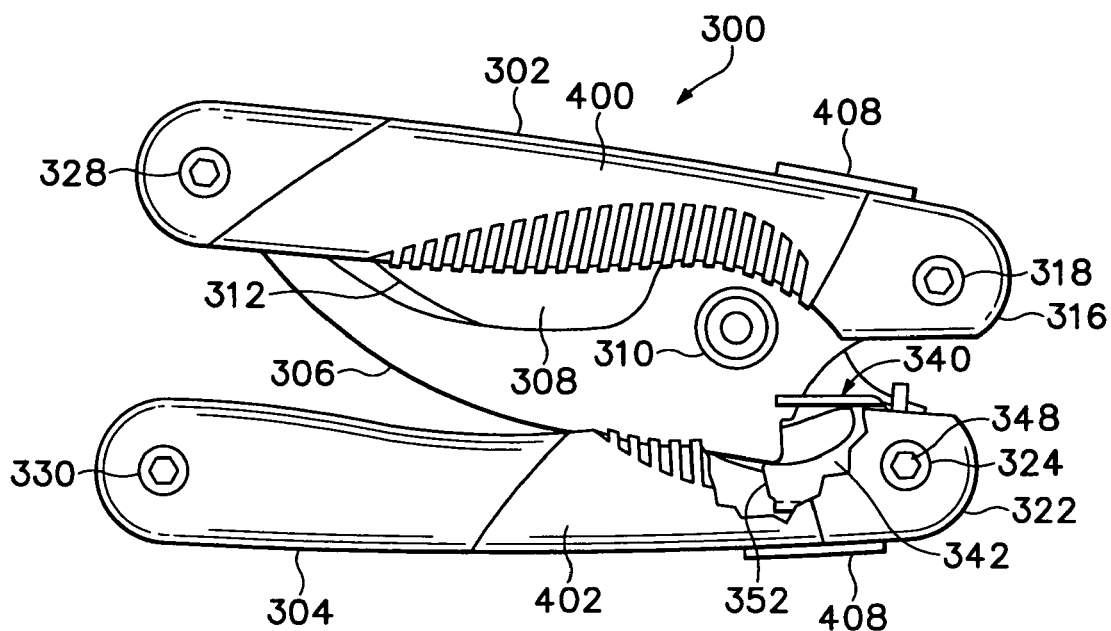

As shown in FIGS. 36, 37, 38, and 39, the action of moving the tool 300 toward its fully folded configuration, to house the jaw 306 and cutting blade 308 between and within the channels defined by the handles 302 and 304, engages the blade safety lock 340. When the handles 302 and 304 are nearly folded about their pivot joints 318 and 324 as shown in FIG. 36, squeezing the front ends 316 and 322 of the handles 302 and 304 moves the jaw 306 and the blade 308 together about the blade pivot joint 310 as shown in FIG. 37. The resulting pressure of the handle 304 against the catch body 342 as the front end 344 encounters the interior of the channel base 382, or the release lever 360 encounters a margin of the side of the handle 304 as shown in FIG. 38, urges the front end 344 toward the blade pivot joint 310. The front end 344 follows the peripheral surface of the jaw 306 as shown in FIG. 38 until it reaches a position where it can move around the heel of the jaw 306 to allow the catch body 342 to pivot about the shaft 348 and allow the front face 352 to engage the notch 354, in the fully folded configuration shown in FIG. 39. Once the tool 309 is in the fully folded configuration shown in FIG. 39, the blade safety lock 340 is engaged. Thereafter, the handles 302 and 304 can safely be swung apart from each other about the handle pivot joints 318 and 324 to extend the handles 32 and 34 with respect to the jaw 306 and cutting blade 308 without the blade 308 moving relative to the jaw 306 and exposing the sharp edge 312.

Referring again to FIGS. 31 and 32, the handle 304 includes a channel 380 of formed sheet metal as its main strength member. With the handle 304 extended with respect to the blade 308 during use of the pruning shear, force exerted on the handle 304 is transferred into the cutting blade 308 through the handle pivot joint 324 and through the end face of the base 382 of the U-shaped channel member 380, acting against a shoulder 384 of the tang 320 of the cutting blade.

Friction may be provided to help prevent the handle 304 from rotating too freely with respect to the tang 320 by adjusting the tension in the pivot shaft 348 of the handle pivot joint 324, which may, for example, be a screw-fastened hollow pin.

Additional friction may be provided to keep the handle 304 in its extended position with respect to the tang 320 of the blade 308 by providing a wedge-like or cam-like protrusion on the tang 320 in position to press against the interior surface of the base 382 of the channel 380 as the handle 304 approaches being fully extended.

Similarly, a metal channel member 388 is the main strength member of the handle 302, and its base 390 has an abutment face adjacent the front end 316 of the handle 302, and the base 314 of the jaw 306 is mounted on the handle pivot joint 318 between the side walls of the channel 388. The jaw 306 is preferably of metal and may be made by any known method, such as by casting or by powder metallurgy. Its base 314 includes a shoulder 392 to engage and be supported by the face of the channel base 390 when the handle 302 is extended with respect to the jaw 306, in order to transfer forces from the handle 302 into the jaw 306. A wedge-like or cam-like protrusion may also be provided on the base 314 of the jaw 306 where it will engage the interior of the channel base 390 with friction sufficient to prevent the handle 302 from rotating about the handle pivot joint 318 unless it is definitely desired to fold the handle 302 with respect to the jaw 306.

Referring again to FIGS. 28, 31, 32, and 39, the handles 302 and 304, similar to the handles 32 and 34, have a generally U-shaped channel configuration, and are constructed to have sufficient strength, an attractive appearance, and to be comfortable in use of the shear.

The inner channel frame member 388 of the handle 302 includes a channel base portion 390 and a pair of parallel side wall portions. A handle shell portion 396 fits around the channel member 388 and interlocks with margins of the side walls of the channel member 388. A shell portion 398 of similar construction, although different in shape, is used in the handle 304, interlocking with the side walls of the main channel frame member 380 of the handle 304.

The shell portions 396 and 398 of the handles 302 and 304 are preferably molded of a suitable rigid, strong, thermoplastic material such as a fiber-reinforced or glass-filled Nylon that is easily molded to provide a desired shape and adequate strength and that may be provided in a desired color for attractive appearance of the tool including such a handle shell portion.

Comfortable grip cushioning portions 400 and 402 extend along and are around fitted parts of the shell portions 396 and 398 as non-slip grip cushioning portions 400 and 402, respectively, of the handles 302 and 304. The grip cushioning portions may be made of a tough, yet resiliently soft and rubber-like thermoplastic elastomeric material such as those available from Advanced Elastomer Systems, of Akron, Ohio, under the trademark Santoprene®. The comfortable grip cushioning portions 400 and 402 extend along and cover the backs 404 and 406 of the handles 302 and 304, as shown in FIG. 39, and extend along portions of the sides and channel side margins to provide comfort in squeezing the handles 302 and 304. The grip cushioning layer portions 400 and 402 are preferably attached to the channel members 388 and 380 and the shell portions 396 and 398 by chemical bonding and adhesion resulting from the process of molding and by being shaped to interlock mechanically with the shell layers 396 and 398 at certain places.

Near the front ends 316 and 322 of the handles 302 and 304, cushioning limit stops 408 are included as protruding parts of the cushioning layers 400 and 402 on the backs 404 and 406 of the handles 302 and 304, as shown in FIGS. 27, 31, and 32. The limit stops 408 engage each other as the handles 302 and 304 approach each other during use of the shears when the cutting blade is alongside the jaw 306, as shown, for example, in FIG. 28. These stops 408 prevent the handles 32 and 34 from being squeezed too tightly together and also protect the user's hands from unnecessary and undesirable shock as the blade 308 finally passes through an object such as a thick branch being cut by the pruning shear.

As with the handles 32 and 34, the handles 302 and 304 are preferably assembled by first placing the respective channel member 388 or 380 in a suitable mold cavity and then molding the shell layer 396 or 398 onto the channel member 388 or 380. The channel member and molded layer 396 or 398 are then placed into a second mold cavity and the elastomeric material forming the cushioning layer 400 or 402 and the limit stop 408 is overmolded into place.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A subassembly for a folding hand tool, comprising:
   (a) a first blade having a base;
   (b) a second blade having a tang and a sharpened edge;
   (c) a blade pivot joint interconnecting said first and second blades, said first and second blades being movable relative to each other about said blade pivot joint between a closed position and an open position;
   (d) a first handle connected to said base of said first blade by a first handle pivot joint and movable about said first handle pivot joint between an extended, operative position and a folded position with respect to said first blade;
   (e) a second handle connected to said tang of said second blade by a second handle pivot joint and movable about said second handle pivot joint between an extended, operative position and a folded position with respect to said second blade;
   (f) a blade safety lock mounted on said second handle, the blade safety lock including a catch body that is movable about a lock pivot mounted on said second handle, between an engaged position holding said blades in said closed position and a disengaged position allowing said blades to move to said open position; and
   (g) wherein said catch body when in said disengaged position provides clearance for movement of said blades to a predetermined opening angle, but prevents movement of said blades beyond said predetermined opening angle.

2. The subassembly of claim 1 wherein said first blade is a bypass support jaw and said second blade is a bypass cutting blade arranged to cooperate with said jaw.

3. The subassembly of claim 2, said jaw defining a cavity surrounding said blade pivot joint, and said subassembly including a spring located within said cavity, said spring urging said jaw and said blade to pivot apart from each other about said blade pivot joint toward said open position.

4. The subassembly of claim 1 wherein each of said handles defines a respective channel having a pair of channel side walls, said channels facing inwardly toward each other when said handles are in their folded positions and facing outwardly apart from each other when said handles are in their extended positions with respect to said first and second blades and wherein each of said side walls of one of said handles includes a cushioning portion of a resiliently soft elastomeric material overlying and extending along a margin thereof.

5. The subassembly of claim 4 wherein one of said channel side walls includes a supporting portion of metal and a molded shell layer of a rigid thermoplastic material attached thereto, and wherein at least a part of said cushioning portion is molded over said shell layer.

6. The subassembly of claim 4 wherein said cushioning portion is molded onto said margins of said side walls.

7. The subassembly of claim 1 wherein said lock pivot is coaxial with said second handle pivot joint.

8. The subassembly of claim 1 wherein said catch body has a finger extending therefrom in such a position that said finger can engage said tang of said second blade so as to limit movement of said catch body about said lock pivot to a predetermined angle away from said engaged position.

9. The subassembly of claim 1 wherein said blade safety lock is arranged with respect to said second handle so that said second handle urges said catch body toward said engaged position when said second handle approaches said folded position thereof.

10. A blade-locking subassembly for a folding multipurpose tool, comprising:
(a) a first blade having a base;
(b) a second blade having a tang;
(c) a blade pivot joint interconnecting said first blade operatively with said second blade, said blades being movable about said blade pivot joint with respect to each other, between an open position and a closed position;
(d) a handle pivot on said tang;
(e) a handle attached to said tang by said handle pivot and movable about said handle pivot between an extended position and a folded position with respect to said second blade;
(f) a blade lock carried on a lock pivot located on said handle, said blade lock being movable about said lock pivot between an engaged position, in which said blade lock holds said first blade in said closed position with respect to said second blade, and a disengaged position in which said blades are free to move with respect to each other between said open position and said closed position wherein said blade lock when in said disengaged position provides clearance for movement of said blades to a predetermined opening angle, but prevents movement of said blades beyond said predetermined opening angle; and
(g) said blade lock being arranged with respect to said handle so that said handle pushes said blade lock and urges said blade lock toward said engaged position when said handle approaches said folded position thereof with respect to said second blade.

11. The subassembly of claim 10 wherein said first and second blades are arranged as a bypass shear.

12. The subassembly of claim 10 wherein said first blade defines a notch and said blade lock includes a catch body moveable to engage said notch and thereby hold said first blade in said closed position when said blade lock is in said engaged position.

13. A subassembly for a folding hand tool, comprising:
(a) a first blade having a base;
(b) a second blade having a tang and a sharpened edge;
(c) a blade pivot joint interconnecting said first and second blades, said first and second blades being movable relative to each other about said blade pivot joint between a closed position and an open position;
(d) a first handle connected to said base of said first blade by a first handle pivot joint and movable about said first handle pivot joint between an extended, operative position and a folded position with respect to said first blade;
(e) a second handle connected to said tang of said second blade by a second handle pivot joint and movable about said second handle pivot joint between an extended, operative position and a folded position with respect to said second blade;
(f) a blade safety lock mounted on said second handle, the blade safety lock including a catch body that is movable about a lock pivot mounted on said second handle, between an engaged position holding said blades in said closed position and a disengaged position allowing said blades to move to said open position;
(g) wherein said first blade is a bypass support jaw and said second blade is a bypass cutting blade arranged to cooperate with said jaw, said jaw defining a cavity surrounding said blade pivot joint, and said subassembly including a spring located within said cavity, said spring urging said jaw and said blade to pivot apart from each other about said blade pivot joint toward said open position; and
(h) wherein said spring is U-shaped and has a first end engaged in a groove defined in said base of said jaw and extending away from said cavity and a second end extending alongside said blade safety lock and engaged with said second handle pivot joint, and wherein a main part of said spring extends arcuately around said blade pivot joint.

14. A subassembly for a folding hand tool, comprising:
(a) a first blade having a base;
(b) a second blade having a tang and a sharpened edge;
(c) a blade pivot joint interconnecting said first and second blades, said first and second blades being movable relative to each other about said blade pivot joint between a closed position and an open position;
(d) a first handle connected to said base of said first blade by a first handle pivot joint and movable about said first handle pivot joint between an extended, operative position and a folded position with respect to said first blade;
(e) a second handle connected to said tang of said second blade by a second handle pivot joint and movable about said second handle pivot joint between an extended, operative position and a folded position with respect to said second blade;
(f) a blade safety lock mounted on said second handle, the blade safety lock including a catch body that is movable about a lock pivot mounted on said second handle, between an engaged position holding said blades in said closed position and a disengaged position allowing said blades to move to said open position; and wherein
(g) said first blade defines a cavity surrounding said blade pivot joint and a groove extending away from said cavity, and wherein the subassembly includes a U-shaped spring located within said cavity, said spring urging said jaw and said blade to pivot apart from each other about said blade pivot joint toward said open position, the spring having a first end engaged in the groove and a second end engaged with said second handle pivot joint, and wherein a main part of said spring extends arcuately around said blade pivot joint.

15. A subassembly for a folding hand tool, comprising:
(a) a first blade having a base;
(b) a second blade having a tang and a sharpened edge;
(c) a blade pivot joint interconnecting said first and second blades, said first and second blades being movable relative to each other about said blade pivot joint between a closed position and an open position;

(d) a first handle connected to said base of said first blade by a first handle pivot joint and movable about said first handle pivot joint between an extended, operative position and a folded position with respect to said first blade;

(e) a second handle connected to said tang of said second blade by a second handle pivot joint and movable about said second handle pivot joint between an extended, operative position and a folded position with respect to said second blade;

(f) a blade safety lock mounted on said second handle, the blade safety lock including a catch body that is movable about a lock pivot mounted on said second handle, between an engaged position holding said blades in said closed position and a disengaged position allowing said blades to move to said open position; and (g) wherein said catch body is free to move through a predetermined but limited angle about said lock pivot and wherein said catch body provides clearance for said blades to be opened to, but not beyond, a predetermined opening angle when said catch body is in said disengaged position.

* * * * *

UNITED STATES PATENT AND TRADEMARK OFFICE
CERTIFICATE OF CORRECTION

| | | |
|---|---|---|
| PATENT NO. | : 7,607,231 B2 | Page 1 of 1 |
| APPLICATION NO. | : 11/199924 | |
| DATED | : October 27, 2009 | |
| INVENTOR(S) | : Glenn A. Klecker et al. | |

It is certified that error appears in the above-identified patent and that said Letters Patent is hereby corrected as shown below:

Column 4, line 14, should read --firmly-- instead of "fly"

Signed and Sealed this
Twenty-fourth Day of May, 2011

David J. Kappos
*Director of the United States Patent and Trademark Office*